United States Patent
Acosta et al.

(10) Patent No.: US 12,386,048 B2
(45) Date of Patent: Aug. 12, 2025

(54) MOVABLE OBJECT PERFORMING REAL-TIME MAPPING USING A PAYLOAD ASSEMBLY

(71) Applicant: SZ DJI TECHNOLOGY CO., LTD., Guangdong (CN)

(72) Inventors: Joshua Acosta, Palo Alto, CA (US); Junli Liu, Guangdong (CN); Yucheng Liu, Guangdong (CN); Arjun Sukumar Menon, San Jose, CA (US); Fernando Pablo Quevedo, Guangdong (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 716 days.

(21) Appl. No.: 17/231,860

(22) Filed: Apr. 15, 2021

(65) Prior Publication Data

US 2021/0239815 A1   Aug. 5, 2021

Related U.S. Application Data

(63) Continuation of application No. PCT/CN2019/113725, filed on Oct. 28, 2019, which
(Continued)

(51) Int. Cl.
*G01S 7/51* (2006.01)
*B64C 39/02* (2023.01)
(Continued)

(52) U.S. Cl.
CPC ............. *G01S 7/51* (2013.01); *B64D 47/00* (2013.01); *B64U 10/14* (2023.01); *G01S 7/4813* (2013.01);
(Continued)

(58) Field of Classification Search
CPC ................................. G01S 7/51; B64C 39/024
See application file for complete search history.

(56) References Cited

U.S. PATENT DOCUMENTS 5,376,759 A    12/1994 Marx et al.
9,870,624 B1 *  1/2018 Narang ................... G06T 7/74
(Continued)

FOREIGN PATENT DOCUMENTS

CN    103941748 A    7/2014
CN    204489196 U    7/2015
(Continued)

OTHER PUBLICATIONS

Office Action, EP App. No. 19880137.5, Mar. 4, 2022, 4 pages.
(Continued)

*Primary Examiner* — Yi Yang
(74) *Attorney, Agent, or Firm* — ANOVA LAW GROUP, PLLC

(57) ABSTRACT

Techniques are disclosed for real-time mapping in a movable object environment. A real-time mapping system can include at least an unmanned aerial vehicle (UAV), comprising a propulsion system, a main body coupled to the propulsion system and a payload assembly coupled to the main body via a payload port, wherein the payload assembly is configured to couple to the payload port and support a scanning sensor and a positioning sensor.

18 Claims, 21 Drawing Sheets

Related U.S. Application Data is a continuation of application No. 16/664,743, filed on Oct. 25, 2019, now Pat. No. 10,983,201, and a continuation of application No. PCT/US2019/058219, filed on Oct. 25, 2019, and a continuation of application No. PCT/US2019/058218, filed on Oct. 25, 2019.

(60) Provisional application No. 62/752,273, filed on Oct. 29, 2018.

(51) Int. Cl.
| | | |
|---|---|---|
| *B64D 47/00* | (2006.01) | |
| *B64U 10/14* | (2023.01) | |
| *G01S 7/481* | (2006.01) | |
| *G01S 17/42* | (2006.01) | |
| *G01S 17/89* | (2020.01) | |
| *G05D 1/00* | (2006.01) | |
| *G06F 3/04845* | (2022.01) | |
| *G06T 15/00* | (2011.01) | |
| *G06T 15/08* | (2011.01) | |
| *B64U 101/30* | (2023.01) | |

(52) U.S. Cl.
CPC .............. *G01S 17/42* (2013.01); *G01S 17/89* (2013.01); *G05D 1/0094* (2013.01); *G05D 1/101* (2013.01); *G06F 3/04845* (2013.01); *G06T 15/00* (2013.01); *G06T 15/08* (2013.01); *B64U 2101/30* (2023.01); *G06T 2200/24* (2013.01); *G06T 2210/56* (2013.01)

(56) References Cited

U.S. PATENT DOCUMENTS

| | | | | |
|---|---|---|---|---|
| 10,298,817 | B1* | 5/2019 | Schlupf | H04N 23/52 |
| 2003/0043058 | A1 | 3/2003 | Jamieson et al. | |
| 2008/0210025 | A1 | 9/2008 | Goossen et al. | |
| 2011/0311099 | A1 | 12/2011 | Derbanne | |
| 2012/0084248 | A1* | 4/2012 | Gavrilescu | G06F 16/9535 |
| | | | | 706/54 |
| 2013/0258107 | A1 | 10/2013 | Delibaltov et al. | |
| 2013/0294514 | A1* | 11/2013 | Rossato | H04N 19/513 |
| | | | | 375/E7.243 |
| 2014/0025331 | A1 | 1/2014 | Ma et al. | |
| 2015/0097950 | A1 | 4/2015 | Wang et al. | |
| 2016/0196687 | A1 | 7/2016 | Alpert et al. | |
| 2016/0223653 | A1 | 8/2016 | Hutson | |
| 2016/0229534 | A1 | 8/2016 | Hutson | |
| 2016/0272308 | A1* | 9/2016 | Gentry | B64C 25/001 |
| 2016/0286175 | A1* | 9/2016 | Dvorak | G01S 19/14 |
| 2016/0349746 | A1 | 12/2016 | Grau | |
| 2017/0001721 | A1 | 1/2017 | Saika et al. | |
| 2017/0161910 | A1 | 6/2017 | Aghamohammadi et al. | |
| 2017/0305570 | A1* | 10/2017 | Heinonen | G01G 19/00 |
| 2018/0012370 | A1 | 1/2018 | Aghamohammadi et al. | |
| 2018/0017682 | A1 | 1/2018 | Tan | |
| 2018/0058861 | A1 | 3/2018 | Doria et al. | |
| 2018/0059665 | A1* | 3/2018 | Shin | H04N 23/69 |
| 2018/0075643 | A1 | 3/2018 | Sequeira et al. | |
| 2018/0232947 | A1 | 8/2018 | Nehmadi et al. | |
| 2018/0304457 | A1* | 10/2018 | Hutson | B25J 9/06 |
| 2018/0324341 | A1* | 11/2018 | Immel | H04N 23/57 |
| 2019/0003836 | A1 | 1/2019 | Zhang et al. | |
| 2019/0066524 | A1* | 2/2019 | Zhang | B64D 47/08 |
| 2019/0332118 | A1 | 10/2019 | Wang et al. | |
| 2020/0249670 | A1 | 8/2020 | Takemura et al. | |
| 2020/0408921 | A1* | 12/2020 | Oh | G05D 1/0055 |

FOREIGN PATENT DOCUMENTS

| | | |
|---|---|---|
| CN | 104851127 A | 8/2015 |
| CN | 104903790 A | 9/2015 |
| CN | 105518490 A | 4/2016 |
| CN | 106225790 A | 12/2016 |
| CN | 205931287 U | 2/2017 |
| CN | 106767820 A | 5/2017 |
| CN | 106840179 A | 6/2017 |
| CN | 107301654 A | 10/2017 |
| CN | 107525501 A | 12/2017 |
| CN | 107640327 A | 1/2018 |
| CN | 107941204 A | 4/2018 |
| CN | 108137151 A | 6/2018 |
| CN | 108181636 A | 6/2018 |
| CN | 108227749 A | 6/2018 |
| CN | 108303710 A | 7/2018 |
| EP | 2697604 A1 | 2/2014 |
| WO | 2012/140190 A1 | 10/2012 |
| WO | 2017/000316 A1 | 1/2017 |
| WO | 2017/183001 A1 | 10/2017 |
| WO | 2018/107330 A1 | 6/2018 |
| WO | 2018152773 A1 | 8/2018 |
| WO | 2018156869 A1 | 8/2018 |
| WO | 2018/170472 A1 | 9/2018 |

OTHER PUBLICATIONS

Notice of Allowance mailed Feb. 27, 2023, in co-pending U.S. Appl. No. 17/211,509, 32 pages.
Gentil et al.; "3D Lidar-IMU Calibration based on Upsampled Preintegrated Measurements for Motion Distortion Correction;" F 2018 IEEE International Conference on Robotics and Automation (ICRA); May 21-25, 2018, Brisbane, Australia; pp. 2149-2155 (Year: 2018).
Non-Final Office Action, U.S. Appl. No. 17/211,509, filed Apr. 27, 2022, 13 pages.
Non-Final Office Action, U.S. Appl. No. 17/229,409, filed May 11, 2022, 25 pages.
Office Action, EP App. No. 19880137.5, Jan. 4, 2022, 3 pages.
Morales et al., "Safe and reliable navigation in crowded unstructured pedestrian areas", Engineering Applications of Artificial Intelligence, vol. 49, Mar. 2016, pp. 74-87.
Supplementary European Search Report and Search Opinion, EP App. No. 19879548.6, Oct. 14, 2021, 21 pages.
Supplementary Partial European Search Report and Search Opinion, EP App. No. 19879446.3, Oct. 15, 2021, 15 pages.
European Supplementary Search Report and Search Opinion, EP App. No. 19879548.6, Jul. 26, 2021, 17 pages.
Garcia-Moreno, A-I., et al., "Automatic 3D City Reconstruction Platform Using a LIDAR and DGPS," Mexican International Conference on Artificial Intelligence, Oct. 2012, pp. 285-297.
Topcon "IP-S3 HD1COMPACT, High-Density 3D Mobile Mapping System" White paper online, Mar. 4, 2016, [retrieved Dec. 23, 2019], retrieved from the internet: https://www.topconpositioning.com/sites/default/files/product_files/ip-s3_broch_7010_2175_revb_sm.pdf, 4 pages.
Byers, S. et al., "Nearest-Neighbor Clutter Removal for Estimating Features in Spatial Point Processes," Journal of the American Statistical Association; publication online, Jun. 1998, [retrieved Dec. 23, 2020], retrieved from the Internet: https://uknow.drew.edu/confluence/display/DREWGIS/ArcMap+-+Changing+or+Transforming+a+Coordinate+System+for+a+Map+Layer, 8 pages.
White, K., "Arc-Map: Changing or Transforming a Coordinate System for a Map Layer," Semantics Scholar, Article [online], Dec. 9, 2011, [retrieved on Dec. 23, 2019], retrieved from the internet: https://pdfs.semanticscholar.org/b4c9/3848b0808566b06e6527901fd07a3aa2a2f4.pdf, 1 page.
International Search Report and Written Opinion for International Patent Application No. PCT/US2019/058218, mailed Jan. 22, 2020, 11 pages.
International Search Report and Written Opinion for International Patent Application No. PCT/US2019/058219, mailed Jan. 3, 2020, 9 pages.
International Search Report and Written Opinion for International Patent Application No. PCT/CN2019/113725, mailed Feb. 6, 2020, 9 pages.

(56) References Cited

OTHER PUBLICATIONS

Non-Final Office Action for U.S. Appl. No. 16/664,743, mailed Sep. 28, 2020, 9 pages.
Notice of Allowance for U.S. Appl. No. 16/664,743, mailed Dec. 21, 2020, 8 pages.
U.S. Office Action issued Dec. 14, 2022, in corresponding U.S. Appl. No. 17/211,509, 14 pp.
International Preliminary Report on Patentability, PCT App. No. PCT/CN2019/113725, May 14, 2021, 6 pages.
International Preliminary Report on Patentability, PCT App. No. PCT/US2019/058218, May 14, 2021, 10 pages.
International Preliminary Report on Patentability, PCT App. No. PCT/US2019/058219, May 14, 2021, 9 pages.
Supplementary European Search Report and Search Opinion, EP App. No. 19880137.5, Jun. 9, 2021, 8 pages.
Xu-ran Li, et al., "Research on automatic calculation method of tunnel over-under excavation based on point clouds", Engineering Blasting, vol. 23, No. 6, Dec. 15, 2017, 5 pages. (with English Abstract).

\* cited by examiner

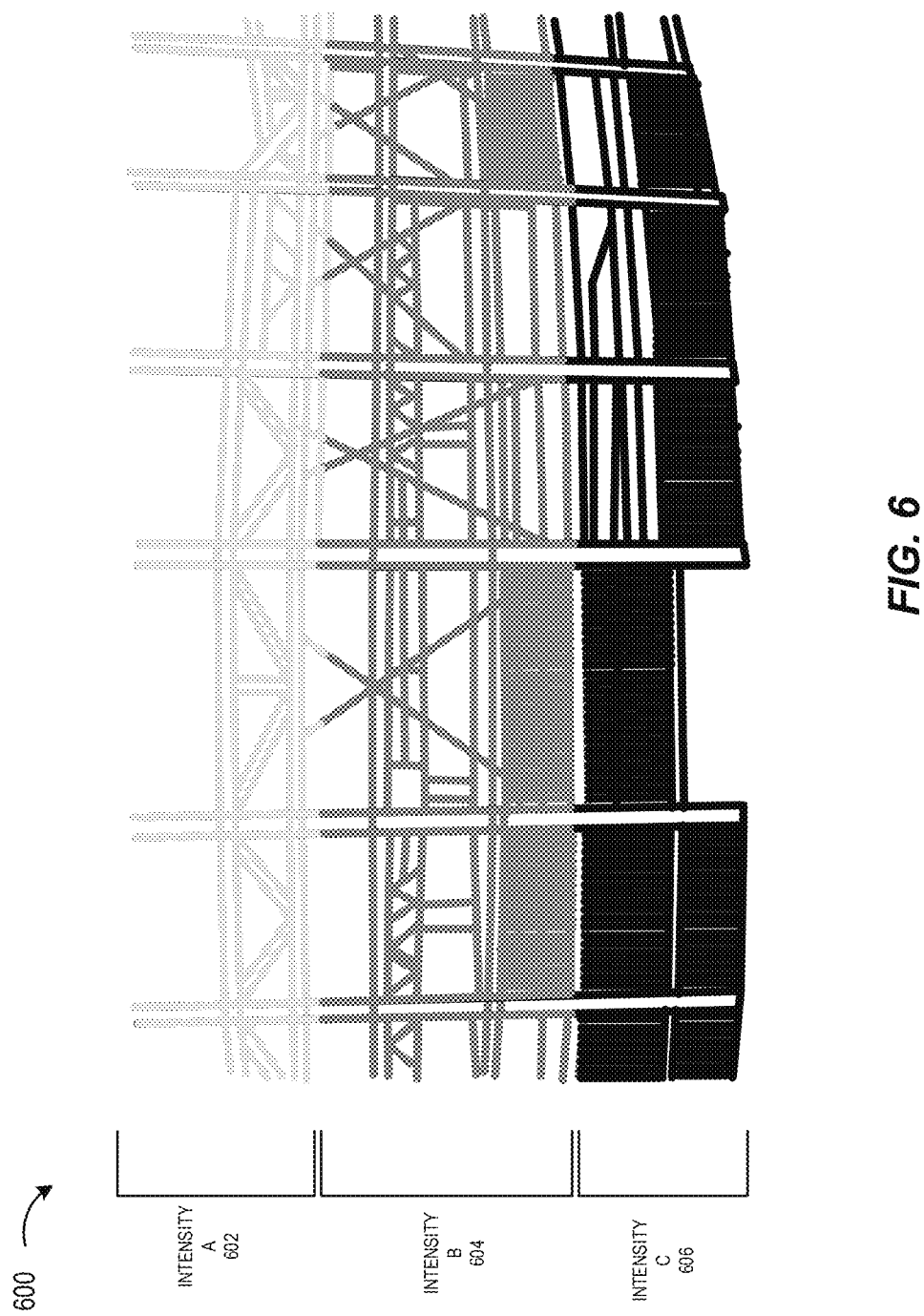

MOVABLE OBJECT PERFORMING REAL-TIME MAPPING USING A PAYLOAD ASSEMBLY

CROSS-REFERENCE TO RELATED APPLICATIONS

This application is a continuation of International Application No. PCT/CN2019/113725, filed Oct. 28, 2019, which claims the benefit of International Application No. PCT/US19/58218, International Application No. PCT/US19/58219, and U.S. Non-provisional application Ser. No. 16/664,743, each of which is filed on Oct. 25, 2019 and claims the benefit of U.S. Provisional Application No. 62/752,273, filed on Oct. 29, 2018, the disclosures of each of which are incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosed embodiments relate generally to techniques for mapping and more particularly, but not exclusively, to a movable object for performing real-time mapping.

BACKGROUNDS

Movable objects such as unmanned aerial vehicles (UAVs) can be used for performing surveillance, reconnaissance, and exploration tasks for various applications. Movable objects may include a payload, including various sensors, which enables the movable object to capture sensor data during movement of the movable objects. The captured sensor data may be rendered to a client device for display, such as a client device in communication with the movable object via a remote control, remote server, or other computing device.

SUMMARY

Techniques are disclosed for real-time mapping in a movable object environment. A real-time mapping system can include at least an unmanned aerial vehicle (UAV). The UAV comprises a propulsion system, a main body coupled to the propulsion system, and a payload assembly coupled to the main body via a payload port. The payload assembly is configured to couple to the payload port and support a scanning sensor and a positioning sensor.

BRIEF DESCRIPTION OF DRAWINGS

FIG. 6 illustrates an example of intensity values in mapping data, in accordance with various embodiments.

DETAILED DESCRIPTION

Figure 1:
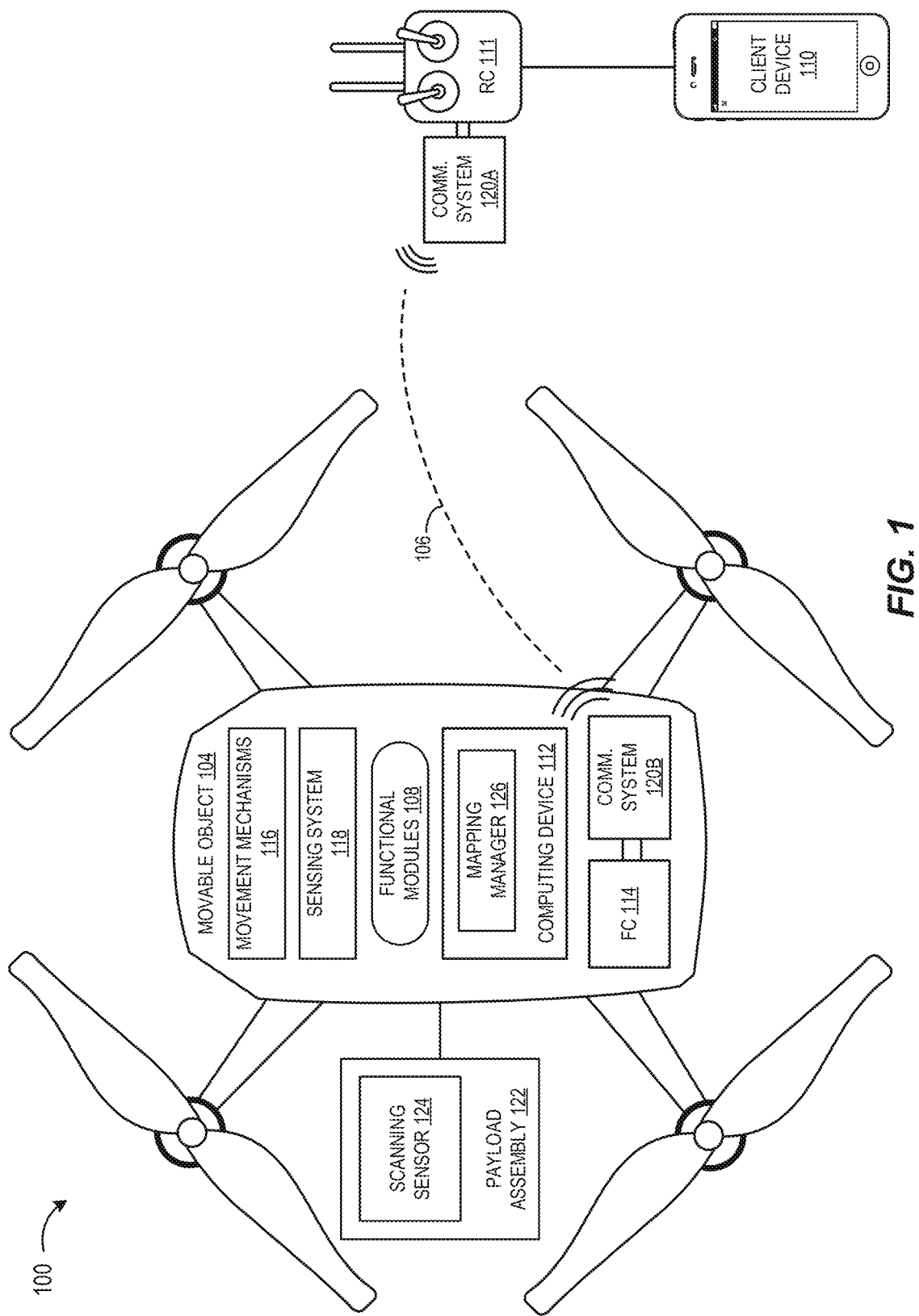
FIG. 1 illustrates an example of a movable object in a movable object environment, in accordance with various embodiments.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The following description of the invention describes target mapping using a movable object. For simplicity of explanation, an unmanned aerial vehicle (UAV) is generally used as an example of a movable object. It will be apparent to those skilled in the art that other types of movable objects can be used without limitation.

Embodiments enable a movable object to map a target environment in real-time using data collected from a positioning sensor and a scanning sensor. Alternative embodiments may take advantage of post-processing to generate a map following completion of one or more data collection missions executed by one or more movable objects. For example, the various embodiments may utilize scan matching techniques for mapping a complex target environment. Embodiments can be used to provide LiDAR-based real-time mapping for various applications, such as construction, surveying, target inspection, etc. Rather than collecting data to be post-processed into a map representation of the target, a map can be constructed in real-time, enabling a version of the map to be rendered on a client device as it is collected. Such live rendering may enable the user to determine if any areas within the target environment have not been scanned by a scanning sensor electronically coupled to the movable object. Additionally, a high-density version of the map can be generated during the mapping mission and downloaded upon return of the movable object. In various embodiments, a mapping manager may utilize a parallel computing architecture to perform the real-time mapping while the movable object is performing its mapping mission. In some embodiments, the mapping data may be output as a LiDAR Data Exchange File (LAS) which may be used by various tools to render the map of the target environment and/or use the mapping data for further processing, planning, etc. Metadata embedded in the LAS output file can facilitate integration of the map with various third-party tools. In various embodiments, the map may be output in various file formats depending on user preferences.

In some embodiments, a mapping manager can receive mapping data from a scanning sensor (such as a LiDAR sensor or other sensor that provides high resolution scanning of a target environment), and positioning data from a positioning sensor (e.g., a global positioning system (GPS) module, real-time kinematic (RTK) module, an inertial measurement unit (IMU) module, or other positioning sensor). The mapping data can be geo-referenced using the positioning data and used to construct the map of the target environment. Embodiments objectively geo-reference the mapping data, enabling various target environments to be mapped regardless of environment complexity.

FIG. 1 illustrates an example of a movable object in a movable object environment 100, in accordance with various embodiments. As shown in FIG. 1, client device 110 in a movable object environment 100 can communicate with a movable object 104 via a communication link 106. The movable object 104 can be an unmanned aircraft, an unmanned vehicle, a handheld device, and/or a robot. The client device 110 can be a portable personal computing device, a smart phone, a remote control, a wearable computer, a virtual reality/augmented reality system, and/or a personal computer. Additionally, the client device 110 can include a remote controller 111 and communication system 120A, which is responsible for handling the communication between the client device 110 and the movable object 104 via communication system 120B. For example, the communication between the client device 110 and the movable object 104 (e.g., an unmanned aircraft) can include uplink and downlink communication. The uplink communication can be used for transmitting control signals, the downlink communication can be used for transmitting media or video stream, mapping data collected scanning sensors, or other sensor data collected by other sensors.

In accordance with various embodiments, the communication link 106 can be (part of) a network, which is based on various wireless technologies, such as the WiFi, Bluetooth, 3G/4G, and other radio frequency technologies. Furthermore, the communication link 106 can be based on other computer network technologies, such as the internet technology, or any other wired or wireless networking technology. In some embodiments, the communication link 106 may be a non-network technology, including direct point-to-point connections such as universal serial bus (USB) or universal asynchronous receiver-transmitter (UART).

In various embodiments, movable object 104 in a movable object environment 100 can include a payload assembly 122 and a payload including various sensors, such as a scanning sensor 124 (e.g., a LiDAR sensor). Although the movable object 104 is described generally as an aircraft, this is not intended to be limiting, and any suitable type of movable object can be used. One of skill in the art would appreciate that any of the embodiments described herein in the context of aircraft systems can be applied to any suitable movable object (e.g., a UAV). In some instances, the payload may be provided on the movable object 104 without requiring the payload assembly.

In accordance with various embodiments, the movable object 104 may include one or more movement mechanisms 116 (e.g., propulsion mechanisms), a sensing system 118, and a communication system 120B. The movement mechanisms 116 can include one or more of rotors, propellers, blades, engines, motors, wheels, axles, magnets, nozzles, animals, or human beings. For example, the movable object may have one or more propulsion mechanisms. The movement mechanisms may all be of the same type. Alternatively, the movement mechanisms can be different types of movement mechanisms. The movement mechanisms 116 can be mounted on the movable object 104 (or vice-versa), using any suitable means such as a support element (e.g., a drive shaft). The movement mechanisms 116 can be mounted on any suitable portion of the movable object 104, such on the top, bottom, front, back, sides, or suitable combinations thereof.

In some embodiments, the movement mechanisms 116 can enable the movable object 104 to take off vertically from a surface or land vertically on a surface without requiring any horizontal movement of the movable object 104 (e.g., without traveling down a runway). Optionally, the movement mechanisms 116 can be operable to permit the movable object 104 to hover in the air at a specified position and/or orientation. One or more of the movement mechanisms 116 may be controlled independently of the other movement mechanisms, for example by an application executing on client device 110, computing device 112, or other computing device in communication with the movement mechanisms. Alternatively, the movement mechanisms 116 can be configured to be controlled simultaneously. For example, the movable object 104 can have multiple horizontally oriented rotors that can provide lift and/or thrust to the movable object. The multiple horizontally oriented rotors can be actuated to provide vertical takeoff, vertical landing, and hovering capabilities to the movable object 104. In some embodiments, one or more of the horizontally oriented rotors may spin in a clockwise direction, while one or more of the horizontally oriented rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 104 (e.g., with respect to up to three degrees of translation and up to three degrees of rotation). As discussed further herein, a controller, such as flight controller 114, can send movement commands to the movement mechanisms 116 to control the movement of movable object 104. These movement commands may be based on and/or derived from instructions received from client device 110, computing device 112, or other entity.

The sensing system 118 can include one or more sensors that may sense the spatial disposition, velocity, and/or acceleration of the movable object 104 (e.g., with respect to various degrees of translation and various degrees of rotation). The one or more sensors can include any of the sensors, including GPS sensors, motion sensors, inertial sensors, proximity sensors, or image sensors. The sensing data provided by the sensing system 118 can be used to control the spatial disposition, velocity, and/or orientation of the movable object 104 (e.g., using a suitable processing unit and/or control module). Alternatively, the sensing system 118 can be used to provide data regarding the environment surrounding the movable object, such as weather conditions, proximity to potential obstacles, location of geographical features, location of manmade structures, and the like.

The communication system 120B enables communication with client device 110 via communication link 106, which may include various wired and/or wireless technologies as discussed above, and communication system 120A. The communication system 120A or 120B may include any number of transmitters, receivers, and/or transceivers suitable for wireless communication. The communication may be one-way communication, such that data can be transmitted in only one direction. For example, one-way communication may involve only the movable object 104 transmitting data to the client device 110, or vice-versa. The data may be transmitted from one or more transmitters of the communication system 120B of the movable object 104 to one or more receivers of the communication system 120A of the client device 110, or vice-versa. Alternatively, the communication may be two-way communication, such that data can be transmitted in both directions between the movable object 104 and the client device 110. The two-way communication can involve transmitting data from one or more transmitters of the communication system 120B of the movable object 104 to one or more receivers of the communication system 120A of the client device 110, and transmitting data from one or more transmitters of the communication system 120A of the client device 110 to one or more receivers of the communication system 120B of the movable object 104.

In some embodiments, a client device 110 may communicate with a mapping manager 126 installed on computing device 112 over a transparent transmission channel of a communication link 106. The transparent transmission channel can be provided through the flight controller of the movable object which allows the data to pass through unchanged (e.g., "transparent") to the mapping manager or other application on computing device 112. In some embodiments, mapping manager 126 may utilize a software development kit (SDK), application programming interfaces (APIs), or other interfaces made available by the movable object, computing device, scanning sensor 124, etc. In various embodiments, the mapping manager may be implemented by one or more processors on movable object 104 (e.g., flight controller 114 or other processors), computing device 112, remote controller 111, client device 110, or other computing device in communication with movable object 104. In some embodiments, mapping manager 126 may be implemented as an application executing on client device 110, computing device 112, or other computing device in communication with movable object 104.

In some embodiments, an application executing on client device 110 or computing device 112 can provide control data to one or more of the movable object 104, payload assembly 122, and payload 124 and receive information from one or more of the movable object 104, payload assembly 122, and payload 124 (e.g., position and/or motion information of the movable object, payload assembly or payload; data sensed by the payload such as image data captured by a payload camera or mapping data captured by a LiDAR sensor; and data generated from image data captured by the payload camera or LiDAR data generated from mapping data captured by the LiDAR sensor).

In some embodiments, the control data may result in a modification of the location and/or orientation of the movable object (e.g., via control of the movement mechanisms 116), or a movement of the payload with respect to the movable object (e.g., via control of the payload assembly 122). The control data from the application may result in control of the payload, such as control of the operation of scanning sensor 124, a camera or other image capturing device (e.g., taking still or moving pictures, zooming in or out, turning on or off, switching imaging modes, changing image resolution, changing focus, changing depth of field, changing exposure time, changing viewing angle or field of view).

In some instances, the communications from the movable object, payload assembly and/or payload may include information obtained from one or more sensors (e.g., of the sensing system 118 or of the scanning sensor 124 or other payload) and/or data generated based on the sensing information. The communications may include sensed information obtained from one or more different types of sensors (e.g., GPS sensors, motion sensors, inertial sensors, proximity sensors, or image sensors). Such information may pertain to the position (e.g., location, orientation), movement, or acceleration of the movable object, payload assembly, and/or payload. Such information from a payload may include data captured by the payload or a sensed state of the payload.

In some embodiments, computing device 112 can be added to the movable object. The computing device can be powered by the movable object and can include one or more processors, such as CPUs, GPUs, field programmable gate arrays (FPGAs), system on chip (SoC), application-specific integrated circuit (ASIC), or other processors. The computing device can include an operating system (OS), such as Windows 10®, Linux®, Unix®-based operating systems, or other OS. Mission processing can be offloaded from the flight controller 114 to the computing device 112. In various embodiments, the mapping manager 126 can execute on the computing device 112, client device 110, payload 124, a remote server (not shown), or other computing device.

In some embodiments, mapping manager 126 can be used to provide LiDAR-based real-time mapping for various applications, such as construction, surveying, target inspection, etc. Rather than collecting data to be post-processed into a map representation of the target, a map can be constructed in real-time, enabling a version of the map to be rendered on client device 110 as it is collected. Such live rendering may enable the user to determine if any areas within the target environment have not been scanned by scanning sensor 124. Additionally, another version of the map may be downloaded and used upon return of the movable object. In various embodiments, the mapping manager 126 may utilize a parallel computing architecture in computing device 112 to perform the real-time mapping. In some embodiments, the mapping manager 126 may perform data compression to transform a dense map into a sparse map to be rendered on client device 110. By way of compressing the dense map into the sparse map, the mapping manager 126 may be used to reduce data size required for transmission from the movable object 104 to the client device 110, and thus, data transmission time and bandwidth are saved for efficient real-time map rendering. In such embodiments, the live rendering of the map may be a lower resolution version or a compressed data version of the map (i.e., a sparse map) compared to the version obtained from the movable object upon its return from scanning the target environment (i.e., a dense map). In some embodiments, the mapping data may be output as a LiDAR Data Exchange File (LAS) which may be used by various tools to render the map of the target environment and/or use the mapping data for further processing, planning, etc. Metadata embedded in the LAS output file can facilitate integration of the map with various third-party tools. In various embodiments, the map may be output in various file formats depending on user preferences.

Mapping manager 126 can receive mapping data from scanning sensor 124. As discussed, scanning sensor 124 may be a LiDAR sensor or other sensor that provides high resolution scanning of a target environment. The mapping manager 126 may also receive positioning data from a positioning sensor (e.g., a GPS module, RTK module, or other positioning sensor). In some embodiments, the positioning sensor may be part of functional modules 108, sensing system 118, or a separate module coupled to movable object 104 which provides positioning data for the movable object. The mapping data can be geo-referenced using the positioning data and used to construct the map of the target environment. Prior methods of 3D mapping have relied on complex environments that are conducive to scan-matching. Unlike prior mapping systems, which require complex environments in order to use scan-matching to prepare the map, embodiments objectively geo-reference the mapping data. This allows for various target environments to be mapped regardless of environment complexity.

Additional details of the movable object architecture are described below with respect to FIG. 2.

Figure 2:
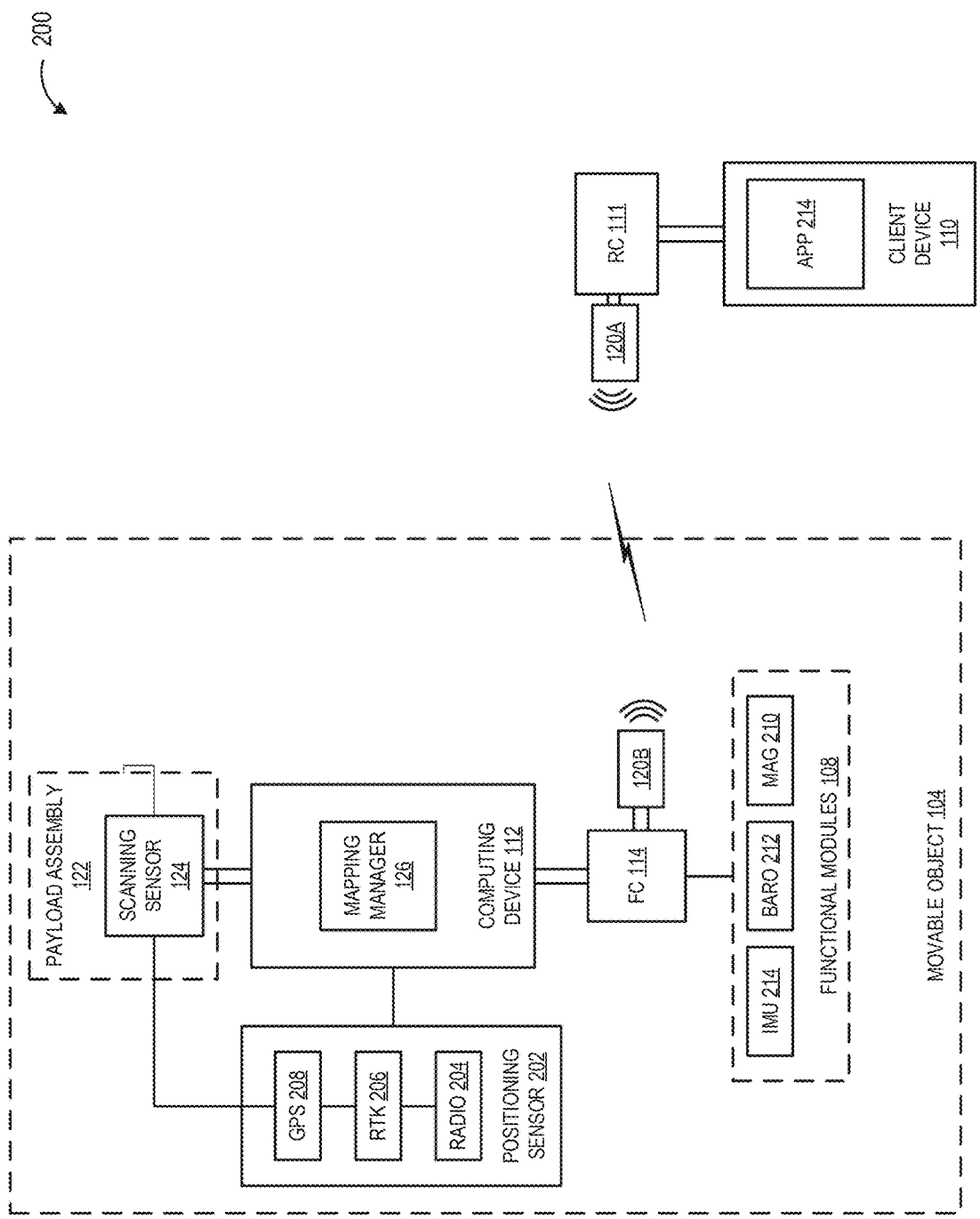
FIG. 2 illustrates an example of a movable object architecture in a movable object environment, in accordance with various embodiments.

FIG. 2 illustrates an example 200 of a movable object architecture in a movable object environment, in accordance with various embodiments. As shown in FIG. 2, a movable object 104 can include a computing device 112 and flight controller 114. The computing device 112 can connect to the scanning sensor 124 via a high bandwidth connection, such as Ethernet or universal serial bus (USB). The computing device 112 may also connect to a positioning sensor 202 over a low bandwidth connection, such as universal asynchronous receiver-transmitter (UART). As discussed, the positioning sensor 202 may be included as a separate module (as shown in FIG. 2) or may be included as part of functional modules 108 or sensing system 118. Positioning sensor 202 may include a radio 204, such as a 4G, 5G, or other cellular or mobile network radio. The radio 204 may be used by RTK module 206 to enhance positioning data collected by GPS module 208. Although a GPS module is shown in FIG. 2, any global navigation satellite service may be used, such as GLOSNASS, Galileo, BeiDou, etc. RTK module 206 can receive a reference signal from a reference station using radio 204 and provide a correction to the positioning data provided by GPS module 208. Additionally, GPS module 208 can output a clock signal, such as a pulse per second (1PPS) signal, to the scanning sensor 124. This allows for the scanning sensor and the GPS sensor to apply synchronized time stamps to their collected data using the same clock signal.

In various embodiments, the computing device 112 can connect to one or more high bandwidth components, such as one or more cameras, a stereo vision module, or payload. The computing device 112 can connect to the flight controller 114 via UART and/or USB to send and receive data to and from the remote control via communication system 120B. In various embodiments, the computing device 112 may include one or more CPUs, GPUs, field programmable gate arrays (FPGA), systems on chip (SoC), or other processor(s).

Flight controller 114 can connect to various functional modules 108, such as magnetometer 210, barometer 212, and inertial measurement unit (IMU) 214. In some embodiments, communication system 120B can connect to computing device 112 instead of, or in addition to, flight controller 114. In some embodiments, sensor data collected by the one or more functional modules 108 and the positioning sensor 202 can be passed from the flight controller 114 to the computing device 112.

In some embodiments, flight controller 114 and computing device 112 can be implemented as separate devices (e.g., separate processors on separate circuit boards). Alternatively, one or more of the flight controller 114 and computing device 112 can be implemented as a single device, such as an SoC. In various embodiments, computing device 112 may be removable from the movable object.

Figure 3:
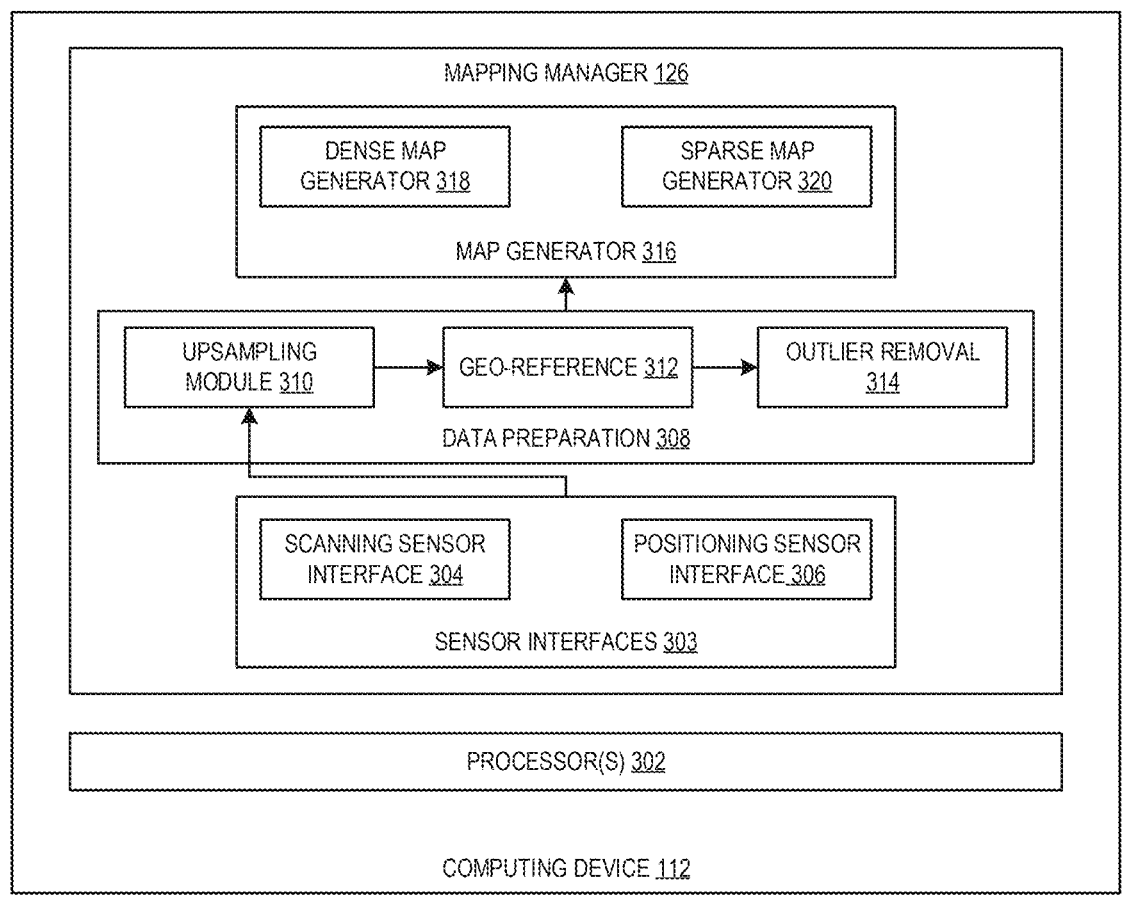
FIG. 3 illustrates an example of a mapping manager in a movable object environment, in accordance with various embodiments.

FIG. 3 illustrates an example 300 of a mapping manager 126 in a movable object environment, in accordance with various embodiments. As shown in FIG. 3, a mapping manager 126 may execute on one or more processors 302 of computing device 112. The one or more processors 302 may include CPUs, GPUs, FGPAs, SoCs, or other processors, and may be part of a parallel computing architecture implemented by computing device 112. The mapping manager 126 may include sensor interfaces 303, data preparation module 308, and map generator 316.

Sensor interfaces 303 can include a scanning sensor interface 304 and a positioning sensor interface 306. The sensor interfaces 303 may include hardware and/or software interfaces. The scanning sensor interface 304 can receive data from the scanning sensor (e.g., a LiDAR or other scanning sensor) and the positioning sensor interface 306 can receive data from the positioning sensor (e.g., a GPS sensor, an RTK sensor, an IMU sensor, and/or other positioning sensors or a combination thereof). In various embodiments, the scanning sensor may produce mapping data in a point cloud format. The point cloud of the mapping data may be a three-dimensional representation of the target environment. In some embodiments, the point cloud of the mapping data may be converted to a matrix representation. The positioning data may include GPS coordinates for the movable object and, in some embodiments, may include roll, pitch, and yaw values associated with the movable object corresponding to each GPS coordinate. The roll, pitch, and yaw values may be obtained from the positioning sensor, such as an inertial measurement unit (IMU), or other sensor. As discussed, the positioning data may be obtained from an RTK module, which corrects the GPS coordinates based on a correction signal received from a reference station. In some embodiments, the RTK module may produce a variance value associated with each output coordinate. The variance value may represent the accuracy of the corresponding positioning data. For example, if the movable object is performing sharp movements, the variance value may go up, indicating less accurate positioning data has been collected. The variance value may also vary depending on atmospheric conditions, leading to different accuracies measured by the movable object depending on the particular conditions present when the data was collected.

The positioning sensor and scanning sensor may share clock circuitry. For example, the positioning sensor may include clock circuitry and output a clock signal to the scanning sensor. In some embodiments, a separate clock circuit may output a clock signal to both the scanning sensor and the positioning sensor. As such, the positioning data and the mapping data may be time-stamped using the shared clock signal.

In some embodiments, the positioning sensor and scanning sensor may output data with differing delays. For example, the positioning sensor and the scanning sensor may not start generating data at the same time. As such, the positioning data and/or mapping data may be buffered to account for the delay. In some embodiments, a buffer size may be chosen based on the delay between the output of each sensor. In some embodiments, a mapping manager can receive the data from the positioning sensor and scanning sensor and output synchronized data using the timestamps shared by the sensor data with respect to the shared clock signal. This enables the positioning data and mapping data to be synchronized before further processing. Additionally, the frequency of the data obtained from each sensor may be different. For example, the scanning sensor may be producing data in the range of hundreds of kHz, while the positioning sensor may be producing data in the range of hundreds of Hz. Accordingly, to ensure each point of the mapping data has corresponding positioning data, upsampling module 310 can interpolate the lower frequency data to match the higher frequency data. For example, assuming the positioning data is produced by the positioning sensor at 100 Hz and the mapping data is produced by the scanning sensor (e.g., a LiDAR sensor) at 100 kHz, the positioning data may be upsampled from 100 Hz to 100 kHz. Various upsampling techniques may be used to upsample the positioning data. For example, a linear fit algorithm, such as least squares, may be used. In some embodiments, non-linear fit algorithms may be used to upsample the positioning data. Additionally, the roll, pitch, yaw values of the positioning data may also be interpolated to match the frequency of the mapping data. In some embodiments, the roll, pitch, and yaw values may be spherical linear interpolated (SLERP) to match the number of points in the mapping data. The time stamps may likewise be interpolated to match the interpolated positioning data. Once the positioning data has been upsampled and synchronized with the mapping data by upsampling module 310, geo-reference module 312 can convert the matrix representation of the mapping data from the frame of reference (or the reference coordinate system) in which it was collected (e.g., scanner reference frame or scanner reference coordinate system) to a desired frame of reference (or a desired reference coordinate system). For example, the positioning data may be converted from the scanner reference frame to a north-east-down (NED) reference frame (or a NED coordinate system). The reference frame to which the positioning data is converted may vary depending on the application of the map that is being produced. For example, if the map is being used in surveying, it may be converted to the NED reference frame. For another example, if the map is being used for rendering motions such as flight simulation, it may be converted to the FlightGear coordinate system. Other applications of the map may effect conversions of the positioning data to different reference frames or different coordinate systems.

Each point in the point cloud of the mapping data is associated with a position in the scanner reference frame that is determined relative to the scanning sensor. The positioning data of the movable object, produced by the positioning sensor, may then be used to convert this position in the scanner reference frame to the output reference frame in a world coordinate system, such as a GPS coordinate system. For example, the position of the scanning sensor in the world coordinate system is known based on the positioning data. In some embodiments, the positioning sensor and the scanning module may be offset (e.g., due to being located at different positions on the movable object). In such embodiments, a further correction factoring in this offset may be used to convert from the scanner reference frame to the output reference frame (e.g., each measured position in the positioning data may be corrected using the offset between the positioning sensor and the scanning sensor). For each point in the point cloud of the mapping data, the corresponding positioning data can be identified using the time stamp. The point can then be converted to the new reference frame. In some embodiments, the scanner reference frame can be converted into a horizontal reference frame using the interpolated roll, pitch, and yaw values from the positioning data. Once the mapping data has been converted into the horizontal reference frame, it may be further converted into a Cartesian frame or other output reference frame. Once each point has been converted, the result is a geo-referenced point cloud, with each point in the point cloud now referenced to the world coordinate system. In some embodiments, the geo-referenced point cloud can be provided to map generator 316 before performing outlier removal to remove outlier data from the geo-reference point cloud.

After the geo-referenced point cloud has been produced, outlier removal module 314 can remove outlier data from the geo-referenced point cloud. In some embodiments, the geo-referenced point cloud may be downsampled, reducing the number of outliers in the data. Downsampling of this data may be performed using voxels. In some embodiments, the points in each voxel may be averaged, and one or more averaged points may be output per voxel. As such, outlier points will be removed from the data set in the course of averaging the points in each voxel. In various embodiments, the resolution of the voxels (e.g., the size of each voxel), may be arbitrarily defined. This allows for sparse and dense downsampled point clouds to be produced. The resolution may be determined by the user, or by the mapping manager based on, e.g., available computing resources, user preferences, default values, or other application-specific information. For example, a lower resolution (e.g., larger voxel size) may be used to produce a sparse downsampled point cloud for visualization on a client device or a mobile device. Additionally, or alternatively, outliers may be removed statistically. For example, the distance from each point to its nearest neighbor may be determined and statistically analyzed. If the distance from a point to its nearest neighbor is greater than a threshold value (e.g., a standard deviation of the nearest neighbor distances in the point cloud), then that point may be removed from the point cloud. In some embodiments, the outlier removal technique may be selectable by the user or be automatically selected by the mapping manager. In some embodiments, outlier removal may be disabled.

As discussed, the point cloud data may be a three-dimensional representation of the target environment. This 3D representation can be divided into voxels (e.g., 3D pixels).

After statistical outlier removal, the resulting point cloud data can be provided to map generator 316. In some embodiments, the map generator 316 may include a dense map generator 318 and/or a sparse map generator 320. In such embodiments, dense map generator 318 can produce a high-density map from the point cloud data received before outlier removal, and sparse map generator 320 can produce a low-density map from the sparse downsampled point cloud data received after outlier removal. In other embodiments, dense map generator 318 and sparse map generator 320 may produce a high-density map and a low-density map separately from the point cloud received both after outlier removal. In such embodiments, each map generator may generate the output map using the same process but may vary the size of the voxels to produce high-density or low-density maps. In some embodiments, the low-density map can be used by a client device or a mobile device to provide real-time visualization of the mapping data. The high-density map can be output as a LIDAR Data Exchange File (LAS) or other file type to be used with various mapping, planning, analysis, or other tools.

The map generator may use the point cloud data to perform a probabilistic estimation of the position of points in the map. For example, the map generator may use a 3D mapping library, such as OctoMap to produce the output map. The map generator can divide the point cloud data into voxels. For each voxel, the map generator can determine how many points are in the voxel and, based on the number of points and the variance associated with each point, determine the probability that a point is in that voxel. The probability may be compared to an occupancy threshold and, if the probability is greater than the occupancy threshold, a point may be represented in that voxel in the output map. In some embodiments, the probability that a given voxel is occupied can be represented as:

$$P(n|z_{1:t}) = \left[1 + \frac{1-P(n|z_t)}{P(n|z_t)} \frac{1-P(n|z_{1:t-1})}{P(n|z_{1:t-1})} \frac{P(n)}{1-P(n)}\right]^{-1}$$

The probability $P(n|z_{1:t})$ of a node n being occupied is a function of the current measurement $z_1$, a prior probability $P(n)$, and the previous estimate $P(n|z_{1:t-1})$. Additionally, $P(n|z_t)$ represents the probability that voxel n is occupied given the measurement $z_t$. This probability may be augmented to include the variance of each point, as measured by the positioning sensor, as represented by the following equations:

$$P(n) = \frac{1}{2}P_x(x, \mu_{xr}, \sigma_x^2)P_y(y, \mu_y, \sigma_y^2)P_z(z, \mu_z, \sigma_z^2) + \frac{1}{2}$$

$$P(n, \mu, \sigma^2) = \frac{1}{\sqrt{2\pi\sigma^2}}e^{-\frac{(x-\mu)^2}{2\sigma^2}}$$

In the equations above, P(n) represents the total probability that a voxel n is occupied. The use of ½ in the above equation is implementation specific, such that the probability is mapped to a range of ½-1. This range may vary, depending on the particular implementation in use. In the above equations, the total probability is the product of probabilities calculated for the x, y, and z dimensions. The probability in each dimension may be determined based on the mean, $\mu$, for each point in that dimension, and the variance, $\sigma^2$, of each measurement in a given dimension, with x, y, and z corresponding to the coordinate values of a given point. A large number of points near the mean point in a given voxel may increase the probability, while a more diffuse collection of points in the voxel may lower the probability. Likewise, a large variance associated with the data (e.g., indicating lower accuracy position data has been collected) may lower the probability while a lower variance may increase the probability. $P(n,\mu,\sigma^2)$ represents the Gaussian distribution for the voxel, given the mean and variance values of the points in that voxel.

If the total probability of a voxel being occupied is greater than a threshold occupancy value, then a point can be added to that voxel. In some embodiments, all of the points in that voxel can be averaged, and the resulting mean coordinate can be used as the location of the point in that voxel. This improves the accuracy of the resulting map over alternative methods, such as using the center point of an occupied voxel as the point, which may result in skewed results depending on the resolution of the voxels. In various embodiments, the occupancy threshold can be set based on the amount of processing resources available and/or based on the acceptable amount of noise in the data for a given application. For example, the occupancy threshold can be set to a default value of 70%. A higher threshold can be set to reduce noise. Additionally, the occupancy threshold may be set depending on the quality of the data being collected. For example, data collected under one set of conditions may be high quality (e.g., low variance) and a lower occupancy threshold can be set, while lower quality data may necessitate a higher occupancy threshold.

The resulting map data, with one point in each occupied voxel, can then be output as an LAS file, or other file format. In some embodiments, the geo-referenced point cloud data may be output without additional processing (e.g., outlier removal). In some embodiments, each point in the point cloud data may also be associated with an intensity value. The intensity value may represent various features of the object being scanned, such as elevation above a reference plane, material composition, etc. The intensity value for each point in the output map may be an average of the intensity values measured for each point in the mapping data collected by the scanning sensor (e.g., a LiDAR sensor).

Figure 4A:
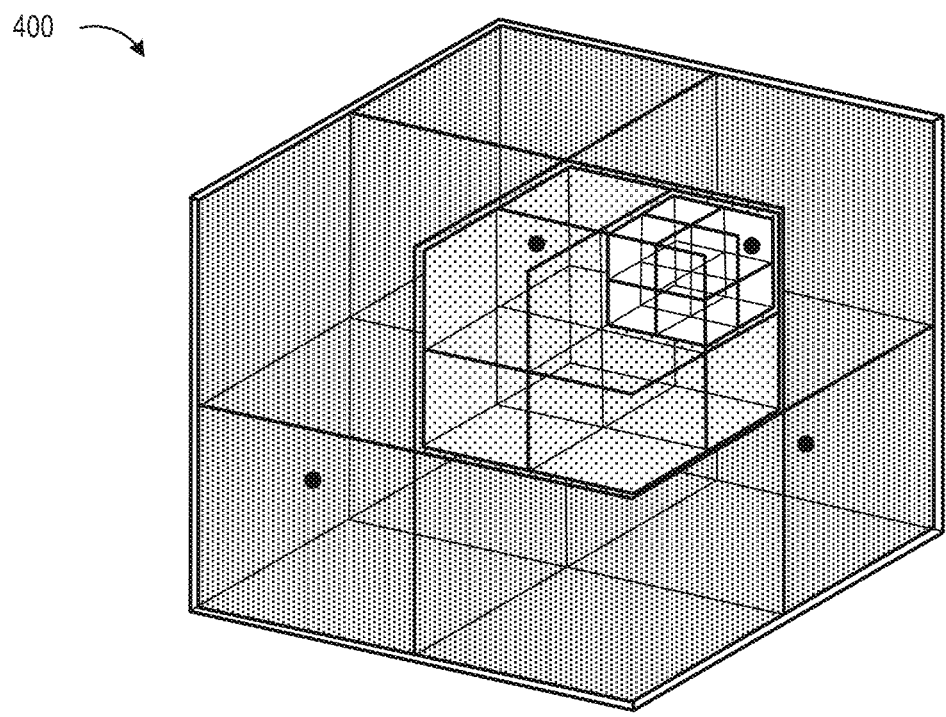
FIGS. 4A and 4B illustrate an example of a hierarchical data structure, in accordance with various embodiments.
Figure 4B:
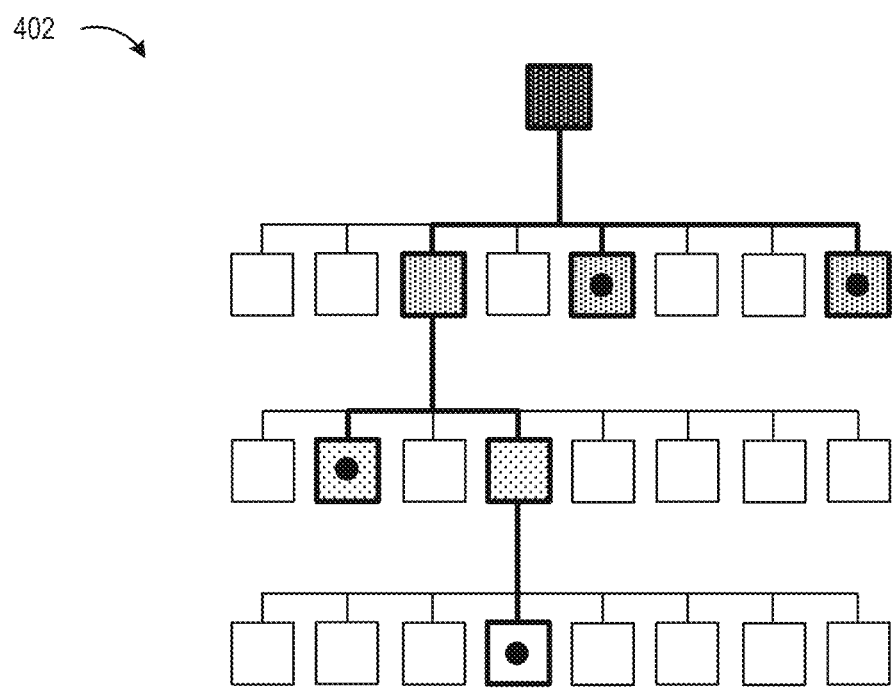

FIGS. 4A and 4B illustrate an example of a hierarchical data structure, in accordance with various embodiments. As discussed above, and as shown in FIG. 4A, data representing a 3D environment 400 can be divided into a plurality of voxels. As shown in FIG. 4A, the target environment can be divided into eight voxels, with each voxel being further divided into eight sub-voxels, and each sub-voxel divided into eight further smaller sub-voxels. Each voxel may represent a different volumetric portion of the 3D environment. The voxels may be subdivided until a smallest voxel size is reached. The resulting 3D environment can be represented as a hierarchical data structure 402, where the root of the data structure represents the entire 3D environment, and each child node represents a different voxel in different hierarchy within the 3D environment.

Figure 5A:
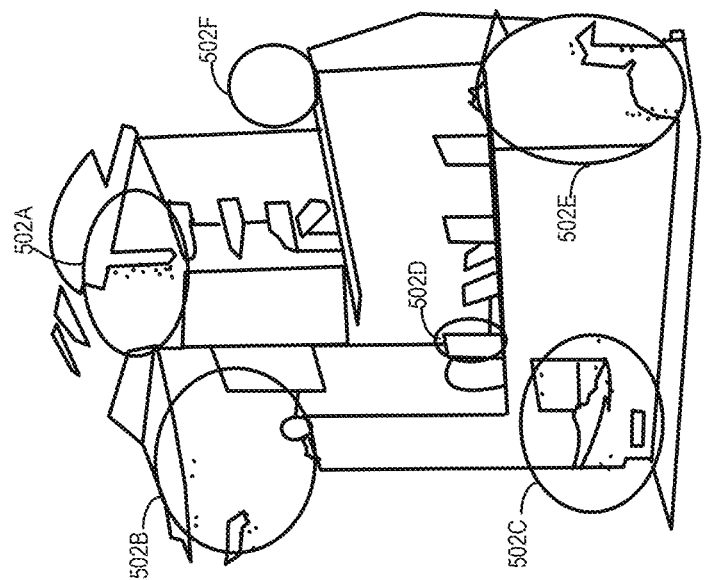
FIGS. 5A and 5B illustrate an example of outlier removal in mapping data, in accordance with various embodiments.
Figure 5B:
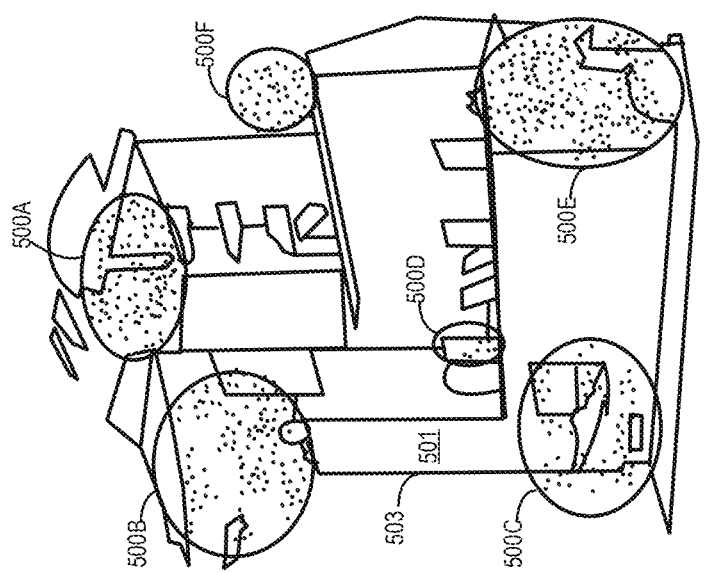

FIGS. 5A and 5B illustrate an example of outlier removal in mapping data, in accordance with various embodiments. As shown in FIG. 5A, when a target object is scanned, it may be represented as a plurality of points, with those points clustered on different parts of the object, including surfaces (such as surface 501), edges (such as edge 503), and other portions of the target object in the target environment. For simplicity of depiction, these surfaces, edges, etc. are shown solid. In various regions 500A-500F of the data, there are additional outlier points. This may be most noticeable in regions of empty space, as shown in FIG. 5A. These points are diffuse, as compared to the more densely packed points of the surfaces and edges of the target object. Outlier removal may be used to eliminate or reduce the number of these points in the data. As discussed above, the geo-referenced point cloud data may be downsampled, reducing the number of outliers in the data. Additionally, or alternatively, outliers may be removed statistically. For example, the distance from each point to its nearest neighbor may be determined and statistically analyzed. If the distance from a point to its nearest neighbor is greater than a threshold value (e.g., a standard deviation of the nearest neighbor distances in the point cloud), then that point may be removed from the point cloud. As shown in FIG. 5B, following outlier removal, the regions of the point cloud data 502A-502F have been reduced, providing a cleaner 3D map.

FIG. 6 illustrates an example 600 of intensity values in mapping data, in accordance with various embodiments. As shown in FIG. 6, one example of intensity values may be to represent elevation above a reference plane. In this example, different elevation ranges may be assigned a different intensity value 602-606, as depicted here using greyscale coloration. In various embodiments, intensity may be represented using different colors to represent different values or ranges of values. Additionally, intensity may be used to represent different materials being scanned. For example, steel and concrete will absorb and reflect the incident radiation produced by the scanning sensor differently, enabling the scanning sensor to identify different materials in use. Each material may be encoded as a different intensity value associated with each point and represented by a different color in the output map. Additionally, although the example shown in FIG. 6 shows three greyscale colors representing different elevation ranges, in various embodiments, continuous gradients of colors may be used to represent continuous changes in elevation value above a reference plane.

Figure 7:
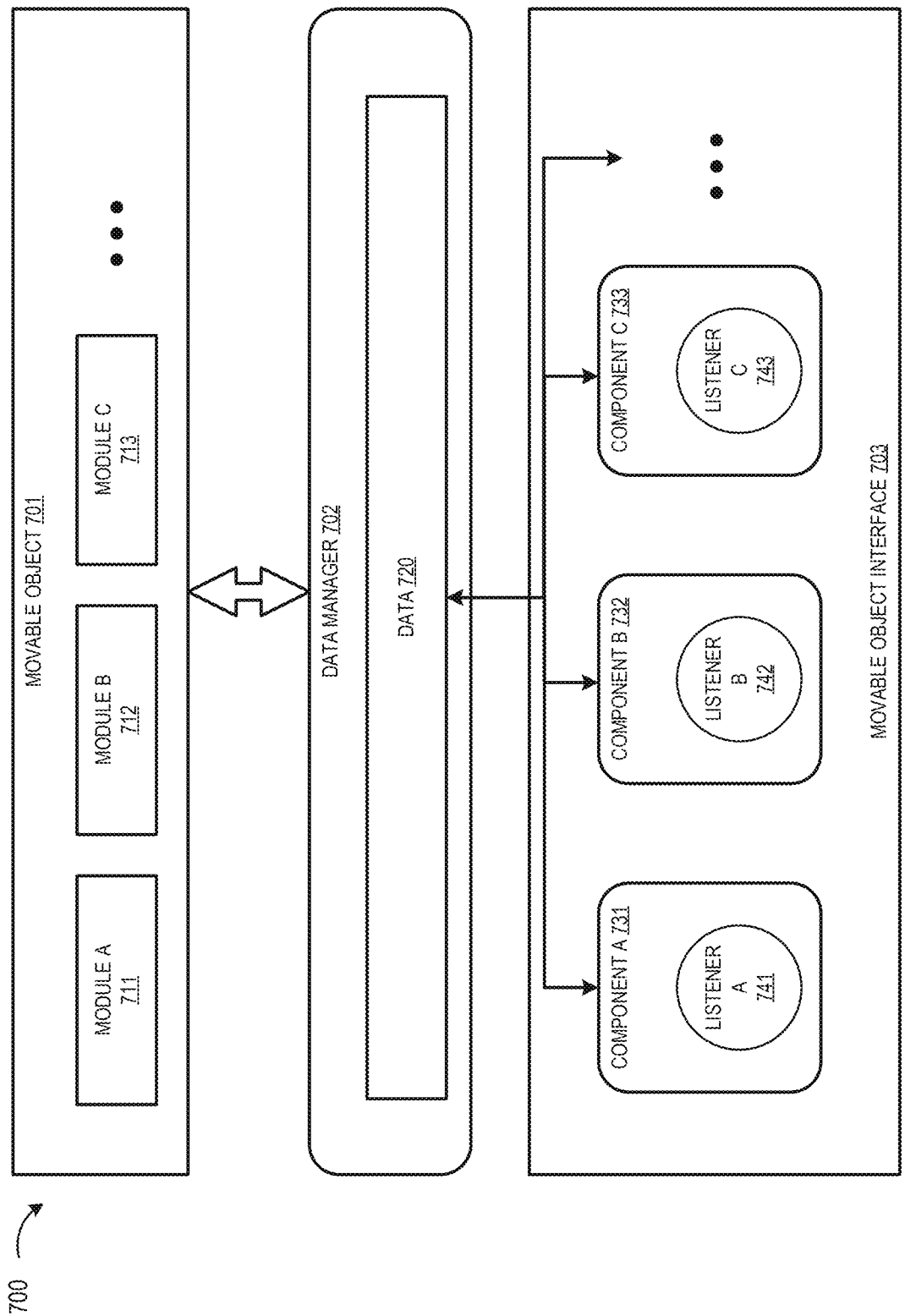
FIG. 7 illustrates an example of supporting a movable object interface in a software development environment, in accordance with various embodiments.

FIG. 7 illustrates an example of supporting a movable object interface in a software development environment, in accordance with various embodiments. As shown in FIG. 7, a movable object interface 703 can be used for providing access to a movable object 701 in a software development environment 700, such as a software development kit (SDK) environment. In some embodiments, the movable object interface 703, may render a real-time map generated by the mapping manager and other interfacing components for receiving user input. The real-time map may be rendered on a display of a client device or other computing device in communication with the movable object. As used herein, the SDK can be an onboard SDK implemented on an onboard environment that is coupled to the movable object 701. The SDK can also be a mobile SDK implemented on an off-board environment that is coupled to a client device or a mobile device. As discussed above, the mapping manager can be implemented using an onboard SDK coupled to the movable object 701 or a mobile SDK coupled to a client device or a mobile device to enable applications to perform real-time mapping, as described herein.

Furthermore, the movable object 701 can include various functional modules A-C 711-713, and the movable object interface 703 can include different interfacing components A-C 731-733. Each said interfacing component A-C 731-733 in the movable object interface 703 corresponds to a module A-C 711-713 in the movable object 701.

In accordance with various embodiments, the movable object interface 703 can provide one or more callback functions for supporting a distributed computing model between the application and movable object 701. In some embodiments, the interfacing components may be rendered on a user interface of a display of a client device or other computing device in communication with the movable object. In such an example, the interfacing components, as rendered, may include selectable command buttons for receiving user input/instructions to control corresponding functional modules of the movable object.

The callback functions can be used by an application for confirming whether the movable object 701 has received the commands. Also, the callback functions can be used by an application for receiving the execution results. Thus, the application and the movable object 701 can interact even though they are separated in space and in logic.

As shown in FIG. 7, the interfacing components A-C 731-733 can be associated with the listeners A-C 741-743. A listener A-C 741-743 can inform an interfacing component A-C 731-733 to use a corresponding callback function to receive information from the related module(s).

Additionally, a data manager 702, which prepares data 720 for the movable object interface 703, can decouple and package the related functionalities of the movable object 701. The data manager 702 may be onboard, that is coupled to or located on the movable object 701, which prepares the data 720 to be communicated to the movable object interface 703 via communication between the movable object 701 and a client device or a mobile device. The data manager 702 may be off-board, that is coupled to or located on a client device or a mobile device, which prepares data 720 for the movable object interface 703 via communication within the client device or the mobile device. Also, the data manager 702 can be used for managing the data exchange between the applications and the movable object 701. Thus, the application developer does not need to be involved in the complex data exchanging process. In some embodiments, mapping manager 126 may be one implementation of data manager 702. In such an embodiment, the mapping manager is used for managing mapping data, including generating a map using mapping data and positioning data and rendering the generated map for display based on a default setting or a user selection.

For example, the onboard or mobile SDK can provide a series of callback functions for communicating instant messages and for receiving the execution results from a movable object. The onboard or mobile SDK can configure the life cycle for the callback functions in order to make sure that the information interchange is stable and completed. For example, the onboard or mobile SDK can establish connection between a movable object and an application on a smart phone (e.g. using an Android system or an iOS system). Following the life cycle of a smart phone system, the callback functions, such as the ones receiving information from the movable object, can take advantage of the patterns in the smart phone system and update the statements accordingly to the different stages in the life cycle of the smart phone system.

Figure 8:
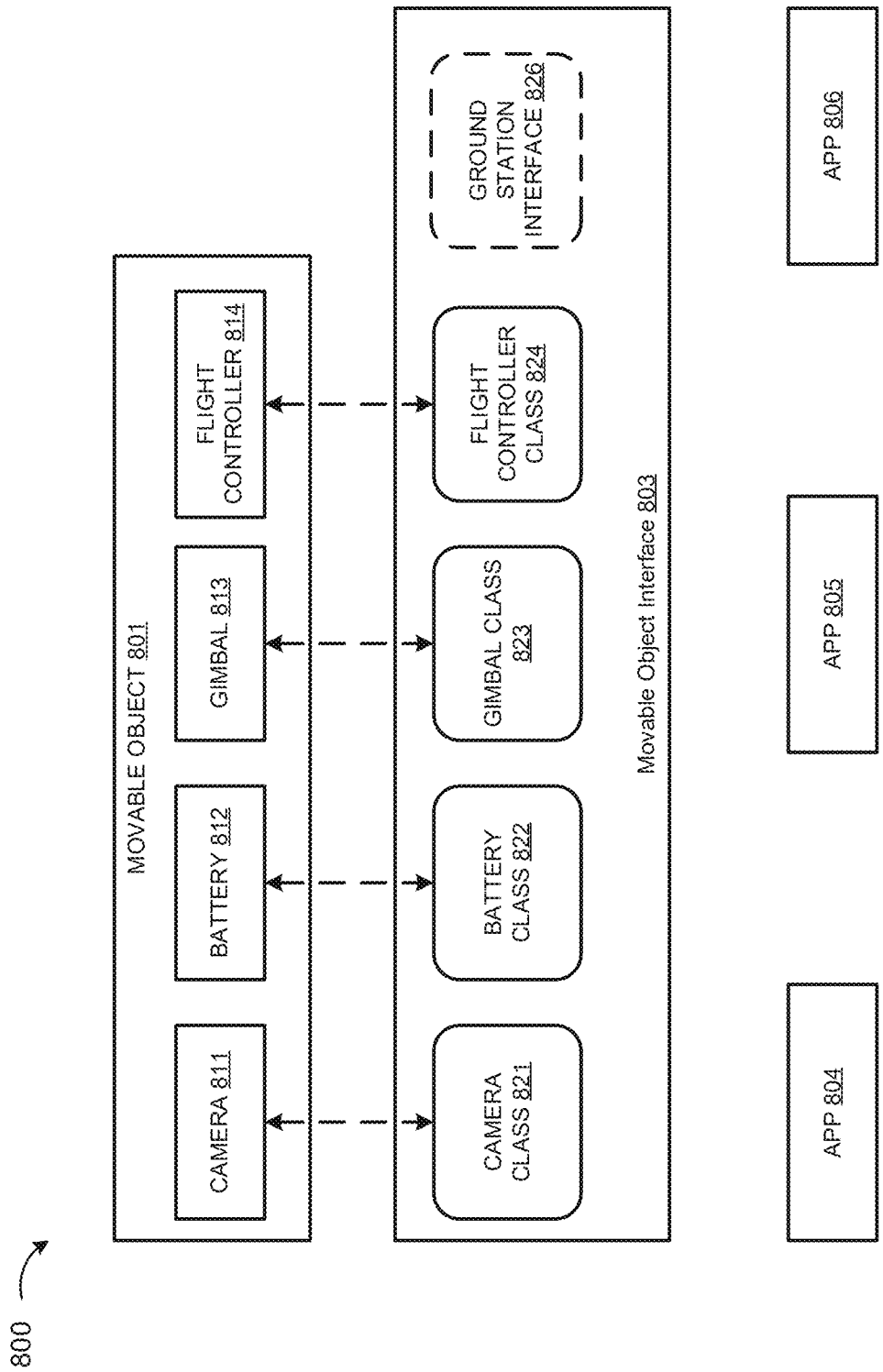
FIG. 8 illustrates an example of a movable object interface, in accordance with various embodiments.

FIG. 8 illustrates an example of a movable object interface, in accordance with various embodiments. As shown in FIG. 8, a movable object interface 803 can be rendered on a display of a client device or other computing devices representing statuses of different components of a movable object 801. Thus, the applications, e.g., APPs 804-806, in the movable object environment 800 can access and control the movable object 801 via the movable object interface 803. As discussed, these apps may include an inspection app 804, a viewing app 805, and a calibration app 806.

For example, the movable object 801 can include various modules, such as a camera 811, a battery 812, a gimbal 813, and a flight controller 814.

Correspondingly, the movable object interface 803 can include a camera component 821, a battery component 822, a gimbal component 823, and a flight controller component

824 to be rendered on a computing device or other computing devices to receive user input/instructions by way of using the APPs 804-806.

Additionally, the movable object interface 803 can include a ground station component 826, which is associated with the flight controller component 824. The ground station component operates to perform one or more flight control operations, which may require a high-level privilege.

Figure 9:
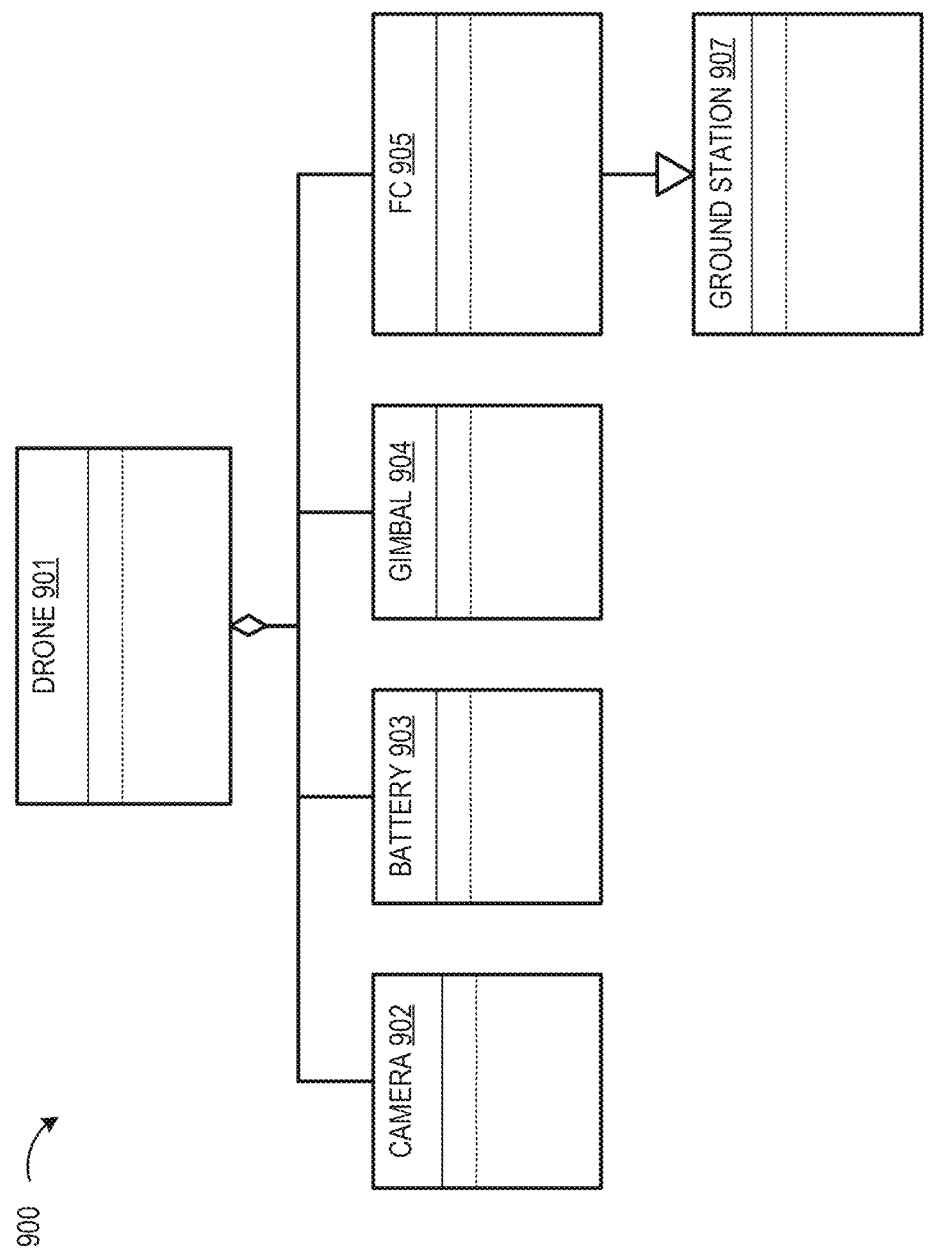
FIG. 9 illustrates an example of components for a movable object in a software development kit (SDK), in accordance with various embodiments.

FIG. 9 illustrates an example of components for a movable object in a software development kit (SDK), in accordance with various embodiments. The SDK 900 may be an onboard SDK implemented on an onboard mapping manager or a mobile SDK implemented on mapping manager located on a client device or a mobile device. The SDK 900 may correspond to all or a portion of the mapping manager described above or may be used to implement the mapping manager as a standalone application. As shown in FIG. 9, the drone class 901 in the SDK 900 is an aggregation of other components 902-907 for a movable object (e.g., a drone). The drone class 901, which have access to the other components 902-907, can exchange information with the other components 902-907 and controls the other components 902-907.

In accordance with various embodiments, an application may be accessible to only one instance of the drone class 901. Alternatively, multiple instances of the drone class 901 can present in an application.

In the SDK, an application can connect to the instance of the drone class 901 in order to upload the controlling commands to the movable object. For example, the SDK may include a function for establishing the connection to the movable object. Also, the SDK can disconnect the connection to the movable object using an end connection function. After connecting to the movable object, the developer can have access to the other classes (e.g. the camera class 902, the battery class 903, the gimbal class 904, and the flight controller class 905). Then, the drone class 901 can be used for invoking the specific functions, e.g. providing access data which can be used by the flight controller to control the behavior, and/or limit the movement, of the movable object.

In accordance with various embodiments, an application can use a battery class 903 for controlling the power source of a movable object. Also, the application can use the battery class 903 for planning and testing the schedule for various flight tasks. As battery is one of the most restricted elements in a movable object, the application may seriously consider the status of battery not only for the safety of the movable object but also for making sure that the movable object can finish the designated tasks. For example, the battery class 903 can be configured such that if the battery level is low, the movable object can terminate the tasks and go home outright. For example, if the movable object is determined to have a battery level that is below a threshold level, the battery class may cause the movable object to enter a power savings mode. In power savings mode, the battery class may shut off, or reduce, power available to various components that are not integral to safely returning the movable object to its home. For example, cameras that are not used for navigation and other accessories may lose power, to increase the amount of power available to the flight controller, motors, navigation system, and any other systems needed to return the movable object home, make a safe landing, etc.

Using the SDK, the application can obtain the current status and information of the battery by invoking a function to request information from in the Drone Battery Class. In some embodiments, the SDK can include a function for controlling the frequency of such feedback.

In accordance with various embodiments, an application can use a camera class 902 for defining various operations on the camera in a movable object, such as an unmanned aircraft. For example, in SDK, the Camera Class includes functions for receiving media data in SD card, getting & setting photo parameters, taking photo and recording videos.

An application can use the camera class 902 for modifying the setting of photos and records. For example, the SDK may include a function that enables the developer to adjust the size of photos taken. Also, an application can use a media class for maintaining the photos and records.

In accordance with various embodiments, an application can use a gimbal class 904 for controlling the view of the movable object. For example, the Gimbal Class can be used for configuring an actual view, e.g. setting a first personal view of the movable object. Also, the Gimbal Class can be used for automatically stabilizing the gimbal, in order to be focused on one direction. Also, the application can use the Gimbal Class to change the angle of view for detecting different objects.

In accordance with various embodiments, an application can use a flight controller class 905 for providing various flight control information and status about the movable object. As discussed, the flight controller class can include functions for receiving and/or requesting access data to be used to control the movement of the movable object across various regions in a movable object environment.

Using the Flight Controller Class, an application can monitor the flight status, e.g. using instant messages. For example, the callback function in the Flight Controller Class can send back the instant message every one thousand milliseconds (1000 ms).

Furthermore, the Flight Controller Class allows a user of the application to investigate the instant message received from the movable object. For example, the pilots can analyze the data for each flight in order to further improve their flying skills.

In accordance with various embodiments, an application can use a ground station class 907 to perform a series of operations for controlling the movable object.

For example, the SDK may require applications to have an SDK-LEVEL-2 key for using the Ground Station Class. The Ground Station Class can provide one-key-fly, on-key-go-home, manually controlling the drone by app (i.e. joystick mode), setting up a cruise and/or waypoints, and various other task scheduling functionalities.

In accordance with various embodiments, an application can use a communication component for establishing the network connection between the application and the movable object.

Figure 10:
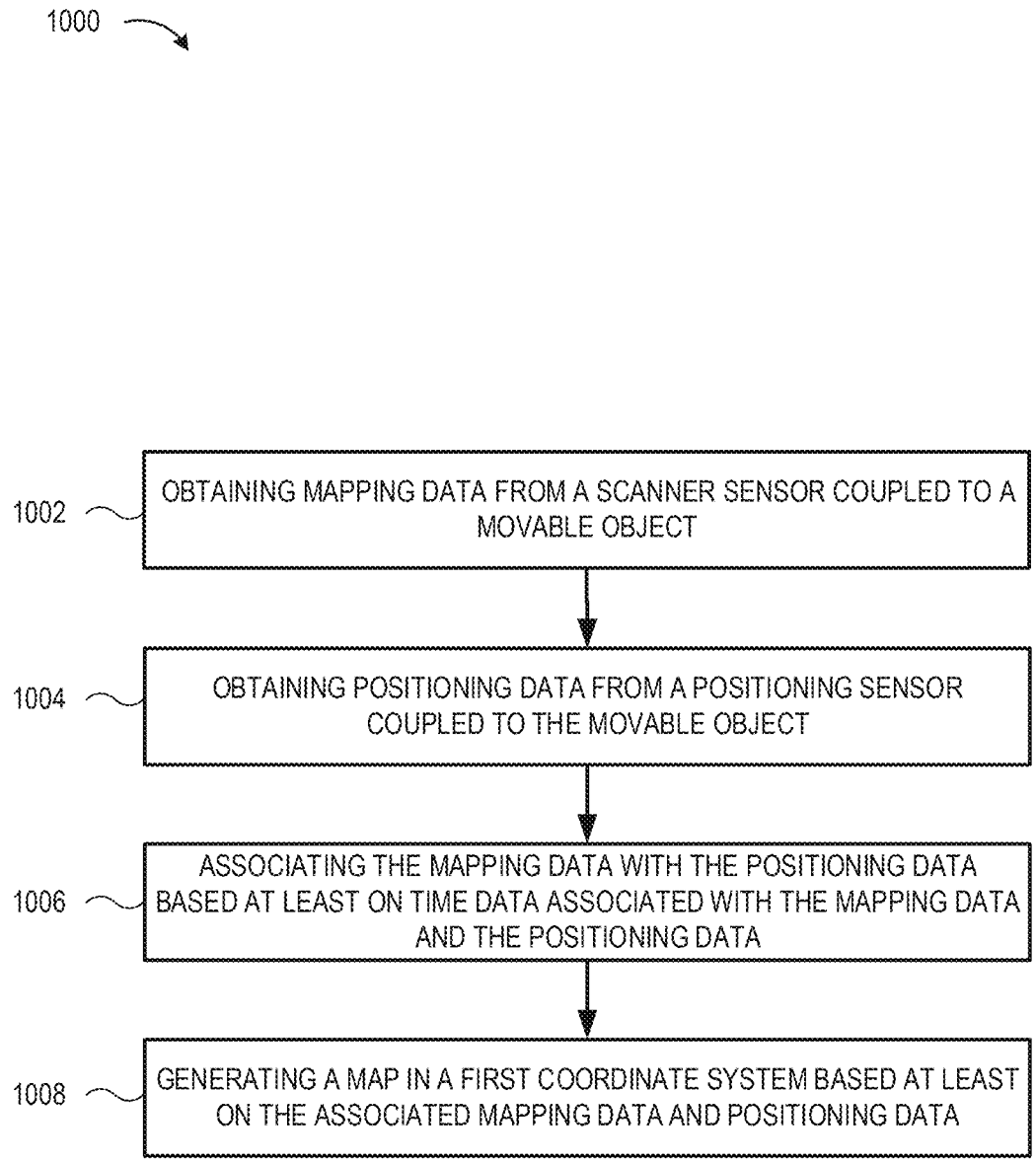
FIG. 10 shows a flowchart of a method of target mapping in a movable object environment, in accordance with various embodiments.

FIG. 10 shows a flowchart of a method of target mapping in a movable object environment, in accordance with various embodiments. At operation/step 1002, mapping data can be obtained from a scanning sensor (e.g., a LiDAR sensor) electronically coupled to a movable object (e.g., a UAV). In some embodiments, the scanning sensor can be a LiDAR sensor. At operation/step 1004, positioning data can be obtained from a positioning sensor (e.g., a GPS sensor, an RTK sensor, an IMU sensor, and/or other positioning sensors or a combination thereof) electronically coupled to the movable object (e.g., a UAV). In some embodiments, the positioning sensor can be an RTK sensor.

At operation/step 1006, the mapping data can be associated with the positioning data based at least on time data associated with the mapping data and the positioning data. In some embodiments, associating the mapping data with the positioning data may include upsampling the positioning data to include a number of positions equal to a number of points in the mapping data, and referencing each point in the mapping data to a corresponding position in the upsampled positioning data. In some embodiments, the time data associated with the mapping data and the positioning data may be obtained using clock circuitry providing a reference clock signal shared by the scanning sensor and the positioning sensor.

At operation/step 1008, a map in a first coordinate system may be generated based at least on the associated mapping data and positioning data. In some embodiments, generating the map may include, for each voxel of a plurality of voxels of the map, determining whether one or more points from the mapping data are located in the voxel, and determining an occupancy probability for the voxel based at least on the number of points in that voxel. In some embodiments, the occupancy probability is determined based on a variance of the positioning data associated with the one or more points located in the voxel. In some embodiments, for each voxel having an occupancy probability greater than a threshold value, an average position of the one or more points in the voxel can be calculated, and a point can be added to the map at the average position. In some embodiments, for each voxel having an occupancy probability greater than a threshold value, an average intensity value of the one or more points in the voxel can be calculated, and the average intensity value can be associated with the point in the map. In an embodiment, the average intensity value is calculated based on feature of each point in the voxel, where the feature of each point is associated with an elevation or a material detected by the scanning sensor.

In some embodiments, the method may further include determining a distribution of points in the mapping data, each of the points in the mapping data associated with a distance from a nearest neighboring point in the mapping data, and removing any points associated with a distance greater than a threshold value. In some embodiments, the method may further include downsampling the mapping data by a scaling factor, dividing the mapping data into a plurality of voxels, and outputting an average point from the downsampled mapping data for each of the plurality of voxels. In some embodiments, the method may further include transforming the map into a second coordinate system and outputting the transformed map. For example, the positioning data may be converted from the scanner reference frame to a north-east-down (NED) reference frame (or a NED coordinate system). The reference frame to which the positioning data is converted may vary depending on the application of the map that is being produced. For example, if the map is being used in surveying, it may be converted to the NED reference frame. For another example, if the map is being used for rendering motions such as flight simulation, it may be converted to the FlightGear coordinate system. Other applications of the map may effect conversions of the positioning data to different reference frames or different coordinate systems.

In some embodiments, geo-referencing as described above may be combined with scan matching, such as Simultaneous Localization and Mapping (SLAM) or LiDAR Odometry and Mapping (LOAM). Traditional methods make use of SLAM with or without inertial navigation input. For example, some methods inject IMU information with SLAM and sometimes inject odometry via GPS which provides an improved mapping algorithm. Unlike traditional methods, embodiments can perform direct geo-referencing as discussed above, and then a layer of SLAM or LOAM can be added on top of the geo-references. This provides a robust mapping algorithm as the geo-references serves as a floor on the quality of the resulting map.

In some embodiments, geo-referencing as described above may be combined with normal distribution transformation (NDT). NDT is a LiDAR scan registration method which is in between a feature-based registration method (such as LOAM) and a point-based registration method (such as iterative closest point). The "features" of the world are described by multivariate Gaussian distributions defined in each voxel. A probability density function (PDF) is generated for each cell and points are matched to the map by maximizing the sum of probability generated by the PDF, points x, and a transformation T:

$$T = \underset{T}{\operatorname{argmin}} \sum_{i=1}^{k} -p_i(Tx_i)$$

$$p_i(x_i) \sim N\left(\overline{\mu_i}, \sum_i\right)$$

$$\overline{\mu_i} = \begin{bmatrix} \mu_x \\ \mu_y \\ \mu_z \end{bmatrix}$$

As discussed, in various embodiments, a movable object may be used for performing real-time mapping of various application environments, such as construction site mapping, surveying, target object mapping, etc. In some embodiments, the movable object may be an unmanned aerial vehicle (UAV), such as shown in FIG. 11, which has been configured to perform real-time mapping.

Figure 11:
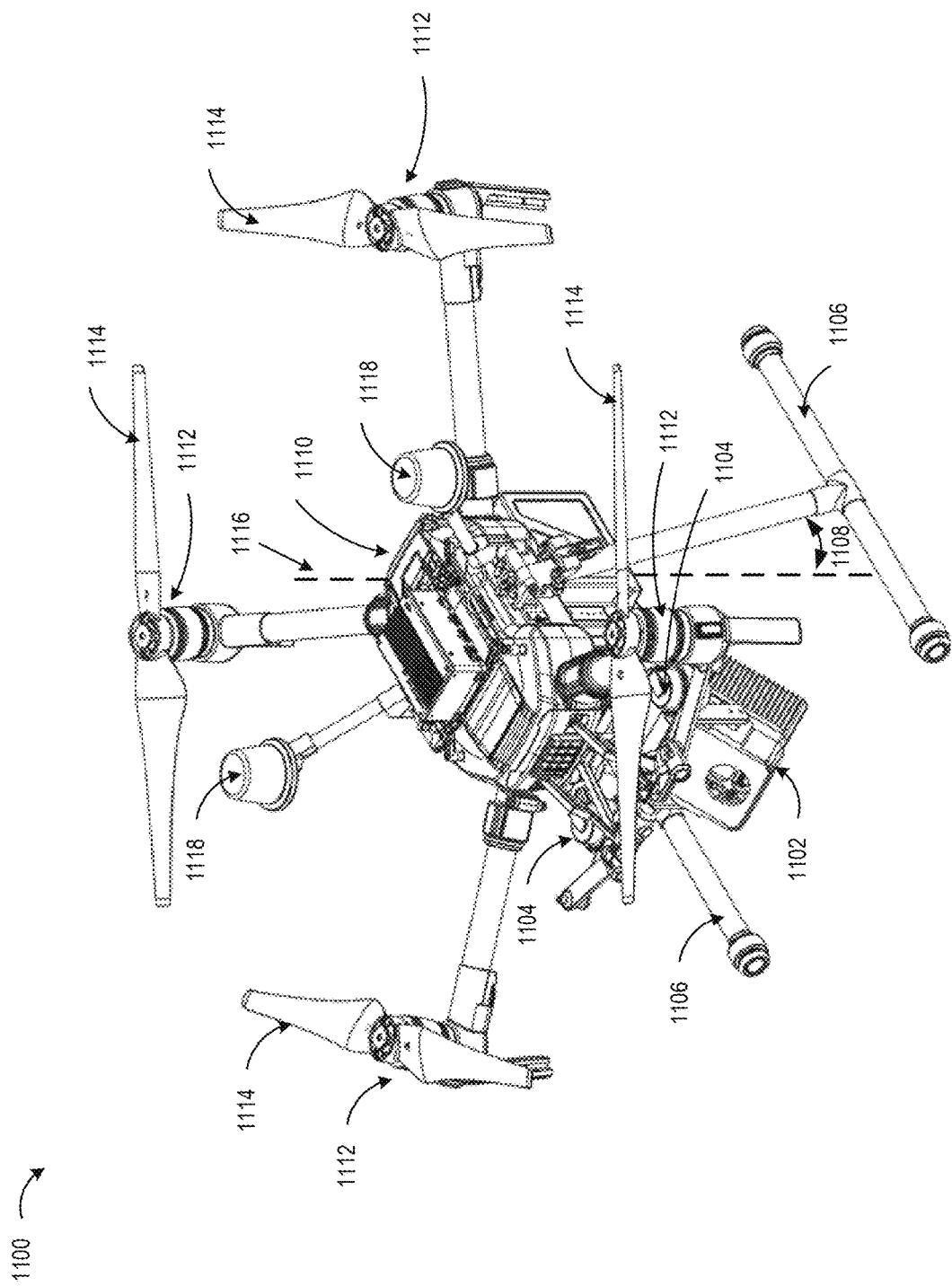
FIG. 11 shows an isometric view of a movable object for performing real-time mapping, in accordance with an embodiment.

FIG. 11 shows an isometric view of a movable object 1100 for performing real-time mapping, in accordance with an embodiment. As discussed above, a UAV in various embodiments may include a movable object body or a main body 1110. The main body may include, or be coupled to, a sensing system, a communications system, a propulsion system, and/or other systems and functional modules as discussed above. The propulsion system may provide movement mechanisms, such as motors 1112 which may independently power rotors/propellers 1114 to cause the UAV to fly and navigate according to a predefined route and/or a route based on real-time user commands received from a user operating a client device or a remote control that is in communication with the UAV.

As shown in FIG. 11, a UAV configured to perform real-time mapping may include a payload assembly (or a sensor assembly) 1102, which is configured to support a scanning sensor and a positioning sensor (as discussed above) and to couple to payload ports 1104 for connecting the payload assembly 1102 to the movable object body 1110. In embodiments, in addition to providing structural support for the payload assembly and payload (e.g., a scanning sensor and a positioning sensor), the payload ports 1104 are further configured to transmit data between the payload assembly and the UAV. For example, the payload ports 1104 may transmit unprocessed or minimally processed sensor data, such as raw mapping data and/or raw positioning data obtained from the scanning sensor and/or the positioning sensor supported by the payload assembly to the UAV. For another example, the payload assembly may further include one or more payload processors that are configured to use data processing techniques, such as sensor fusion, senor calibration, or data compression, to obtain post-processed sensor data. In such an example, the payload ports 1104 may transmit the post-processed sensor data form the payload assembly to the UAV. As shown in FIG. 11, the GPS receivers 1118 that is coupled to the UAV may receive GPS signals from satellites. The received GPS signals may be used by the positioning sensor, such as an RTK sensor, located within the main body 1110 of the UAV or within the payload assembly 1102 to improve accuracy of positioning data. In circumstances where the GPS signals are used by the RTK sensor located within the payload assembly, the GPS signals may be transmitted from the UAV to the RTK sensor via the payload ports 1104.

In some embodiments, the UAV may further include landing gear assemblies 1106 designed to provide a secure platform when not in flight and during landing/takeoff, while not interfering with the field of view (FOV) of the scanning sensor of payload assembly 1102. In some embodiments, each landing gear assembly may be extended outward from a vertical axis 1116 with an angle 1108 to avoid the landing gear from obstructing the FOV of the scanning sensor 1102 in use. In some embodiments, the FOV of the scanning sensor 1102 may span approximately 40 degrees. In such embodiments, each landing gear assembly may be extended outward from the vertical axis 1116 for at least 20 degrees on each side to clear the FOV of the scanning sensor 1102. This may include fixed landing gear assembly, such as shown in FIG. 11, and adjustable landing gear assembly, which may provide adjustment of the angle of the landing gear assembly dynamically, based on the type or the scanning pattern of scanning sensor in use.

Figure 12:
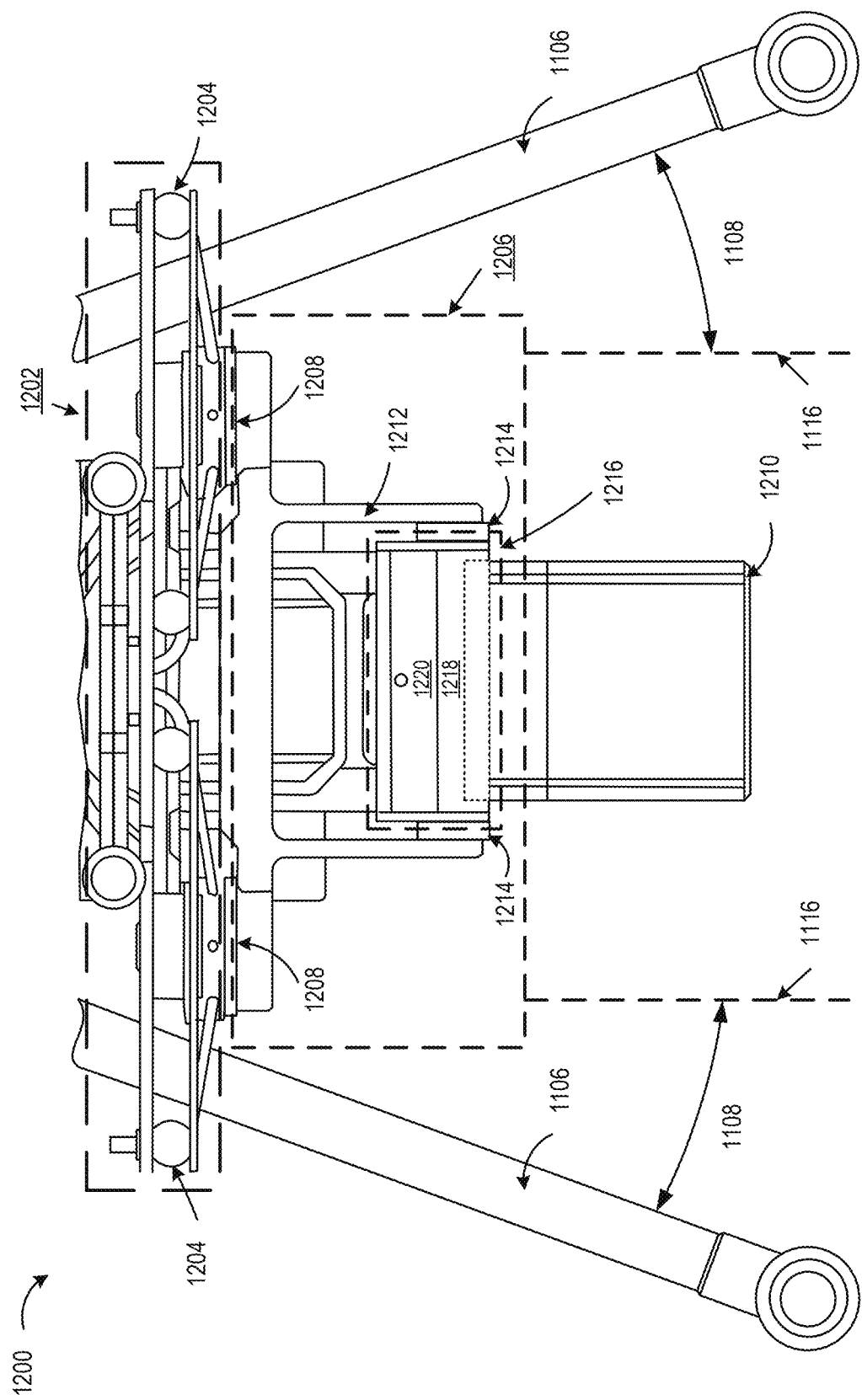
FIG. 12 shows a front view of a mounting assembly, a payload assembly, and a scanning sensor that are coupled to a movable object, in accordance with various embodiments.

FIG. 12 shows a front view of a mounting assembly 1202, a payload assembly 1206, and a scanning sensor 1210, that are coupled to a movable object (not shown), in accordance with various embodiments. In the example 1200 shown in FIG. 12, a scanning sensor 1210 (such as a LiDAR sensor) can be supported by a payload assembly 1206 that is coupled to a movable object (not shown) via a one or more payload ports 1208. The one or more payload ports 1208 can be mechanically coupled to the payload assembly 1206, as well as provide electronic coupling between the payload assembly 1206 and the main body of the UAV. In embodiments, the one or more payload ports 1208 may be provided directly by the main body of the UAV and coupled to the payload assembly 1206 configured to orient the scanning sensor 1210. Optionally, the one or more payload ports 1208 may be provided by a mounting assembly 1202. The mounting assembly 1202 is coupled to the main body of the UAV on one side, and coupled to the payload assembly 1206 via the payload ports 1208 on the other side. In such embodiments, the mounting assembly 1202 and the payload assembly 1206 may jointly control the orientation of the scanning sensor 1210. Each structural support component of mounting assembly 1202 and/or the payload assembly 1206 may be manually adjusted by a user, automatically controlled by the mapping manager coupled to the UAV, or automatically adjusted by accepting commands input by a user through a client device and/or a remote control. Additionally, as shown in FIG. 12, the mounting assembly 1202 providing the payload ports 1208 may include one or more dampers 1204 for stabilizing the payload ports 1208 and/or to absorb or reduce vibration to the payload assembly 1206 caused by the main body.

The mounting assembly 1202, which may be optional, can be used to provide payload ports 1208 for coupling the payload assembly 1206 to the main body of the UAV. The mounting assembly 1202 can be any device or mechanism suitable for interfacing between the payload assembly 1206 and the main body of the UAV, such as a plate, bracket, frame, stand, arm, shaft, or suitable combinations of such devices. The coupling between the mounting assembly 1202 and the payload assembly 1206 uses payload ports permitting the payload assembly 1206 and the payload to be easily removed from the mounting assembly 1202 via a quick release mechanism, such as a twist and lock mechanism. In addition to mechanical coupling the payload assembly 1206 to the main body of the UAV, the payload ports provided by the mounting assembly may also provide electrical coupling enabling data transmission between the payload assembly 1206 and the UAV.

In some embodiments, the mounting assembly 1202 can include a plurality of individual support components (e.g., cradled, brackets, frames, holders, arms), some of which may be movable relative to one another. In embodiments, each support component of the mounting assembly 1202 may be adjusted by a user manually to change the orientation of the scanning sensor 1210. In other embodiments, each support component of the mounting assembly 1202 may be actuated by one or more actuators (e.g., motors, such as AC motors or DC motors). Any number of actuators can be used, such as one, two, three, or more. In some instances, each support component of the mounting assembly 1202 can be coupled to a single actuator. Alternatively, a single actuator can be coupled to a plurality of support components of the mounting assembly. By way of using actuator(s), any suitable combination of support components can be used in order to achieve the desired orientation movement of the scanning sensor 1210. The actuator(s) can independently or jointly actuate an orientation movement of the mounting assembly 1210, including movements about one or more axes of rotation (e.g., roll axis, pitch axis, or yaw axis). The movements can cause the scanning sensor 1210 to rotate about one or more corresponding axes of rotation relative to the main body of the UAV to achieve the scanning angle preferred by a user.

The payload assembly 1206 may include a payload support bracket 1212, adjustable pivot brackets 1214, and a payload support structure 1216. The upper end of the payload support bracket 1212 is configured to couple to the main body of the UAV using one or more payload ports 1208, which are provided directly by the main body of the UAV or via the mounting assembly 1202. The lower end of the payload support bracket 1212 is configured to couple to adjustable pivot brackets 1214 for changing and adjusting a scanning angle of the scanning sensor 1210 (e.g., a LiDAR sensor).

The adjustable pivot brackets 1214, on one end, are coupled to the payload support bracket 1212 and, on the other end, are coupled to the payload support structure 1216 supporting the scanning sensor 1210 (e.g., a LiDAR sensor). The adjustable pivot brackets 1214 is configured such that the scanning angle of the scanning sensor 1210 (e.g., a LiDAR sensor) may be changed by adjusting the relative position between the scanning sensor 1210 and the structure of the payload support bracket 1212.

In embodiments, the adjustable pivot brackets 1214 may be adjusted by a user manually to change the orientation of the scanning sensor 1210, so as to perform a customized mapping mission. In other embodiments, the adjustable pivot brackets 1214 may be actuated by one or more actuators (e.g., motors, such as AC motors or DC motors). Any number of actuators can be used, such as one, two, three, or more. The actuator can actuate a rotation of the adjustable pivot brackets 1214 about one or more axes of rotation (e.g., roll axis, pitch axis, or yaw axis). The rotation can cause the scanning sensor 1210 to rotate about one or more corresponding axes of rotation relative to the main body of the UAV. The change in attitude of the scanning sensor 1210 (e.g., along one or more of a roll axis, a pitch axis, and/or a yaw axis) may be achieved by the mounting assembly 1202 (e.g., by adjusting the adjustable pivot brackets 1214), the payload assembly 1206 (e.g., by adjusting one or more support components), or a combination of both.

Additionally, or optionally, the scanning angle of the scanning sensor 1210 may be manually or automatically adjusted to multiple different orientations by way of adjusting the one or more structural support components of the mounting assembly 1202, as discussed above. In embodiments, the mounting assembly 1202 and the adjustable pivot brackets 1214 may be adjusted jointly, such that the combined adjustments to the mounting assembly 1202 (e.g., changes to one or more support components) and the payload assembly 1206 (e.g., changes to the adjustable pivot brackets 1214) cause the scanning angle of the scanning sensor 1210 to be oriented at a user-preferred angle. As discussed above, the mounting assembly 1202 and/or the adjustable pivot brackets 1214 may be manually adjusted by a user or be coupled to actuators/motors triggered by control signals sent from the UAV in communication with a client device or a remote control operated by a user. The control signals comprise user commands to control the actuators/motors, enabling the mounting assembly 1202 and the adjustable pivot brackets 1214 to be adjusted cooperatively so as to change the orientation of the scanning sensor 1210.

The payload support structure 1216 may include a scanning sensor support 1218 and a positioning sensor support 1220 structure. The scanning sensor support 1218 includes a U-shaped cavity that is configured to support or receive at least a portion of the scanning sensor 1210 (e.g., a portion of a LiDAR sensor as shown in dashed lines within the scanning sensor support 1218) on one side, while the positioning sensor support 1220 includes a space that is configured to accommodate one or more positioning sensor(s) (e.g., an RTK sensor or an IMU sensor) on the other side. In embodiments, the positioning sensor located within the positioning sensor support 1220 is used to detect a pose of the scanning sensor 1210 (e.g., a LiDAR sensor). The scanning sensor 1210 and the positioning sensor may both be supported by the payload support structure 1216 and be placed relatively close to each other. Accordingly, the positioning sensor may conduct a precise detection for the pose of the scanning sensor, so as to generate a map with improved quality and precision.

In embodiments, the payload support structure 1216 may further include one or more payload processors located within the positioning sensor support 1220 of the payload support structure 1216 configured to conduct sensor data processing using various signal processing techniques, such as sensor fusion, data compression, etc. The raw sensor data, after being processed by the payload processor(s), may turn into post-processed sensor data, such as enhanced/fused positioning data with improved precision or compressed sensor data with smaller data size. The post-processed sensor data can then be transmitted to the UAV via the sensor payload(s) 1208, which improves the quality and efficiency for generating a real-time map from collected sensor data. For example, the one or more payload processors may include a pose processor, which is configured to determine a pose of the scanning sensor using positioning sensor data (e.g., the RTK data, IMU data) or combined positioning data generated by combining various positioning sensor data (e.g., combining RTK data and IMU data to generate RTK/IMU data using sensor fusion). For another example, the one or more payload processors may include a LiDAR processer, which is configured to process raw LiDAR data, such as removing noise or errors from raw LiDAR data. In some embodiments, the LiDAR processor may transform raw LiDAR data obtained from the LiDAR sensor into sparse LiDAR data using outlier removal process, as discussed above. In other embodiments, the LiDAR processor may perform initial raw LiDAR data processing by removing noise and errors, and then send the processed LiDAR data to the computing device (e.g., a mapping manager) of the UAV for transforming the processed LiDAR data to sparse LiDAR data. For another example, the one or more payload processors may be configured to correlate positioning data obtained from the positioning sensor and mapping data obtained from the LiDAR sensor. In some embodiments, the sensor data processed by the one or more payload processors located within the positioning sensor support of the payload support structure 1216 may be transmitted to the computing device, such as a mapping manager, located within the main body of the UAV for further computation and map generation.

In embodiments, the payload assembly 1206 can be attached/removed from the movable object via the one or more payload ports 1208. For example, each payload port may provide a twist and lock mechanism or other quick release mechanisms to attach/remove and secure the payload assembly 1206. The one or more payload ports 1208 may be provided directly by the main body of the UAV or provided by the mounting assembly 1202. Some or all of the one or more payload ports 1208 are configured for mechanical or structural support only, for power/data transmission only (e.g., transmission of sensor data, power, control signals, etc.), or for both mechanical support and power/data transmission. The specific configuration (e.g., the number, location, orientation, etc.) of the one or more payload ports 1208 may depend on the characteristics of the payload (e.g., the weight, dimension, number of the sensors), and the mounting assembly or the UAV providing the one or more payload ports 1208. For example, from the mechanical support perspective, a heavier payload or a larger payload may require more number and/or larger payload ports, while a lighter payload or a smaller payload only requires fewer number and/or smaller payload port(s). For another example, from the power/data transmission perspective, a payload that interacts with the UAV, such as conduct power/data/control signals transmission with the UAV, may require more number and/or larger payload port. In circumstances where the payload ports provide both structural support and power/data transmission, the specific configuration (e.g., the number, location, orientation, etc.) of the one or more payload ports 1208 may be designed considering both structural support and power/data transmission perspectives, as discussed above. For example, a heavier payload or a larger payload including various types of sensors to be transmitted to the UAV may require a further larger number and/or size of payload ports, and vice versa.

In some embodiments, some or all of the one or more payload ports 1208 can provide structural support for the payload assembly 1206 and the payload, including various sensors, that are supported by the payload assembly 1206 (e.g., the scanning sensor 1210 support by the scanning grove 1218, positioning sensor(s) and/or payload processor(s) supported by the positioning sensor support 1220). In some embodiments, as shown in the embodiment of FIG. 12, the payload assembly 1206 can be attached to the main body of the UAV via the one or more payload ports 1208 and, optionally, via the mounting assembly 1202 along with the one or more payload ports 1208. The specific configuration (e.g., the number, location, orientation, etc.) of the one or more payload ports 1208 is designed to secure the weight/dimension of the payload, including the scanning sensor 1210 (e.g., a LiDAR sensor), positioning sensor(s), and/or payload processors, that are supported by the payload support structure 1216 of the payload assembly 1206. As shown in FIG. 12, the two payload ports 1208 are provided at the bottom of the mounting assembly 1202. The two payload ports 1208 are separated in distance on the left and right side of the mounting assembly 1202 for supporting the payload assembly 1206 steadily. The disposition, size, and/or distance for the separated payload ports 1208 may be designed based on the characteristic of the payload (e.g., the weight/dimension of the scanning sensor 1210, the weight/dimension of the payload assembly 1206, the weight/number of the various positioning sensors/payload processor located within the positioning sensor support 1220, the data size to transmit raw sensor data collected by the scanning sensor 1210 and/or various positioning sensors, the data size to transmit sensor data processed by payload processor, etc.) In some embodiments, the sensor payload may weigh approximately 850 grams. In such embodiments, the payload ports are designed to support the weight for at least 850 grams.

In embodiments, the one or more payload ports 1208 may provide electrical support, including sensor data communication for transmitting unprocessed/minimally processed or post-processed sensor data between the payload assembly 1206 and the UAV. The payload ports 1208 may send/receive data to/from the scanning sensor 1210 (e.g., a LiDAR sensor), positioning sensors and/or the payload processor(s) that are located within the positioning sensor support 1220 of the payload support structure 1216 actuators(s), actuator controller(s) (e.g., ESCs), or any other components that are payload support structure supported by the payload assembly 1206 from/to the UAV. In addition to sensor data transmission, the payload ports 1208 can provide other signal transmission, including providing power from a power source (e.g., batteries) of the UAV to the scanning sensor 1210 (e.g., a LiDAR sensor), positioning sensors, the payload processor(s), actuators(s), actuator controller(s) (e.g., ESCs), or any other components that are supported by the payload assembly 1206 payload support structure. In embodiments, the signals transmitted through the payload ports 1208 may include control signals from the UAV to the payload assembly 1206 representing commands to orient the scanning angle of the scanning sensor 1210 (by way of controlling the mounting assembly 1202 and/or the payload assembly 1206), to change scanning pattern of the scanning sensor 1210, or to change scanning rate or scanning frequency of the scanning sensor 1210 for customizing a scanning mission, and the like.

In some embodiments, the UAV may further include a landing gear assembly 1106 designed to provide a secure platform when not in flight and during landing/takeoff, while not interfering with the field of view (FOV) of the scanning sensor 1210 supported by the payload assembly 1206. In some embodiments, each landing gear assembly 1106 may be extended outward from a vertical axis 1116 with an angle 1108 to avoid the landing gear from obstructing the FOV of the scanning sensor 1210 in use. In some embodiments, the FOV of the scanning sensor 1210 may span approximately 40 degrees. In such embodiments, each landing gear assembly may be extended outward from the vertical axis 1116 for at least 20 degrees on each side to clear the FOV of the scanning sensor 1210. In embodiments, the angle 1108 may be other degrees, e.g., 10 degrees, 15 degrees, 25 degrees, 30 degrees, 35 degrees, such that the landing gear assembly 1106 is outside the FOV of the scanning sensor 1210 in use. The landing gear assembly 1106 may include fixed landing gear assembly, such as shown in FIG. 11, and adjustable landing gear assembly, which may provide adjustment of the angle 1108 of the landing gear assembly dynamically, based on the type the scanning pattern, and/or the FOV of scanning sensor in use.

Figure 13:
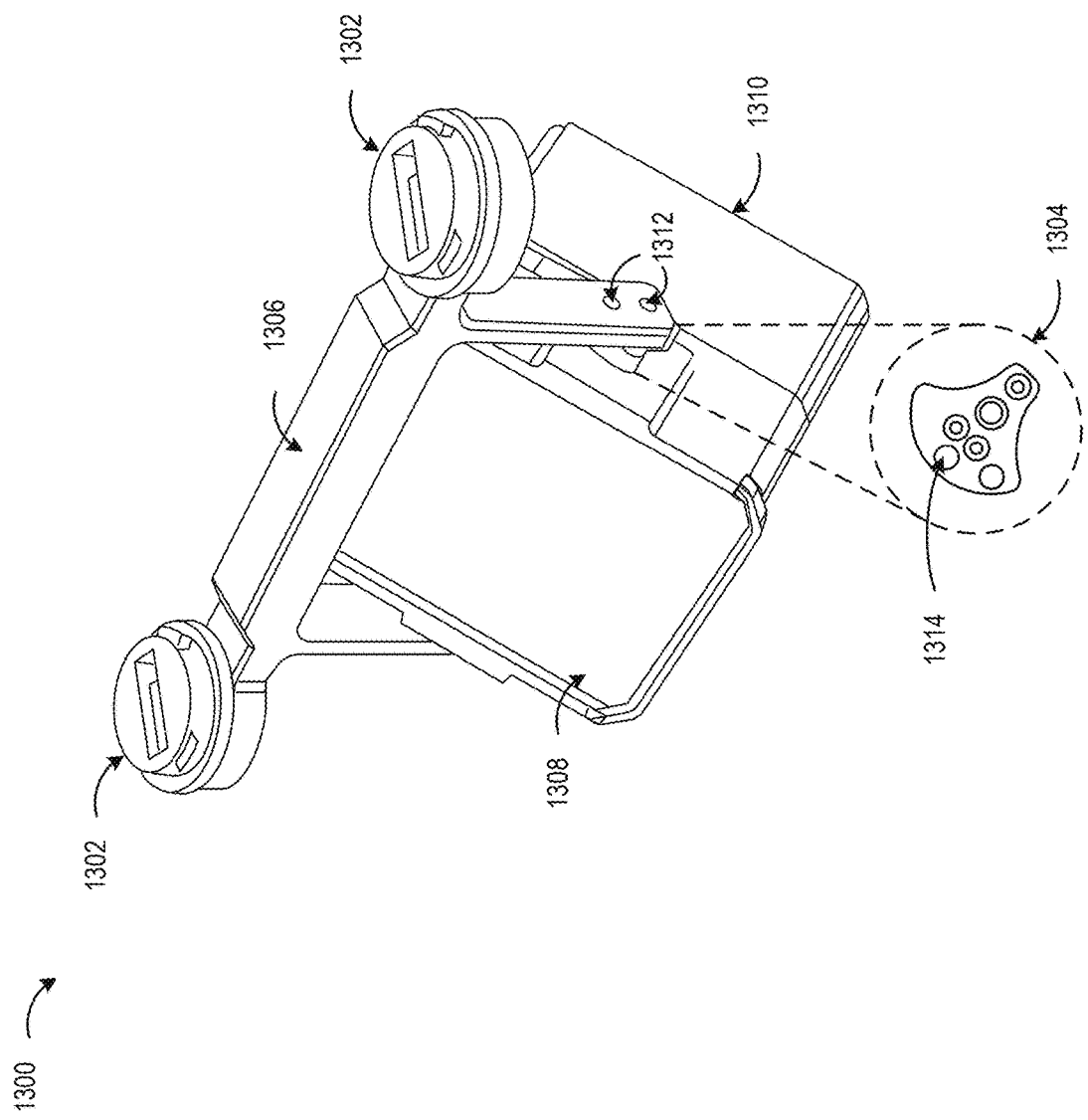
FIG. 13 shows an isometric view of a payload assembly, in accordance with an embodiment.

FIG. 13 shows an isometric view of a payload assembly 1300, in accordance with an embodiment. As shown in FIG. 13, the payload assembly can include a payload support bracket 1306, as discussed above. The upper end of the payload support bracket 1306 may include one or more payload port connectors 1302. The one or more payload port connectors 1302 are configured to connect to the payload ports, provided directly by the main body of the UAV or by a mounting assembly, using a twist and lock mechanism or other quick release mechanisms. The twist and lock mechanism be enable a user to attach the payload assembly 1300 to the payload ports with a pushing motion and a clockwise/counter-clockwise twisting motion, and to detach with a counter-clockwise/clockwise twisting motion and a pulling motion. Other quick release mechanisms may enable a user to rapidly, mechanically attach/detach the payload assembly 1300 to the payload ports with a short sequence of simple motions (e.g., rotating or twisting motions, pushing/pulling motions, sliding motions, switching motions, pressing/depressing a button or plunger, etc.). The quick release mechanism may require no more than one, two, three, or four motions to performing attaching/detaching action. In some instances, a quick release mechanism can be applied manually by a user with or without using tools. The lower end of the payload support bracket 1306 may be connected to a payload support structure 1308 via an adjustable pivot bracket 1304. As discussed above, the adjustable pivot bracket 1304 may orient the scanning sensor 1310 at different scanning angles 1001141 Once the payload assembly is connected to the payload ports, power, control, and/or data signals can be sent to and/or received from the scanning sensor (e.g., a LiDAR sensor) and positioning sensor, the payload processor(s), actuators(s), actuator controller(s) (e.g., ESCs), or any other components that are supported by the payload assembly. In some embodiments, the orientation of the scanning sensor 1310 can be changed manually by a user through twisting the adjustable pivot bracket 1304. Optionally, the orientation of the scanning sensor 1310 can be changed automatically through controlling the adjustable pivot bracket 1304 via actuator(s) or motors, as discussed above. For example, the adjustable pivot bracket 1304 that is connected to a motorized controller, enables the orientation to be adjusted in response to an angle command received from a user (e.g., using a client application) via one or more of the payload port. In some embodiments, as shown in FIG. 13, the adjustable pivot bracket 1304 can enable manual adjustment of the scanning angle of the scanning sensor 1310 (e.g., a LiDAR sensor). The scanning angle position may be achieved manually using the payload support brackets 1306 and the adjustable pivot bracket 1304, by aligning holes 1312 in the payload support bracket 1306 and corresponding holes 1314 in the adjustable pivot bracket 1304 using fasteners. In embodiments, the positions of the holes provided by the payload support bracket 1306 and the adjustable pivot bracket 1304 may be predetermined during manufacturing process based on the scanning sensor in support. In some embodiments, rather than holes which provide predefined angular positions, the payload support brackets 1106 and the adjustable pivot bracket 1304 may include corresponding slots, which enable the user to select various angular positions.

In addition to manually orienting the adjustable pivot bracket 1304, the orientation may be conducted automatically through control signals transmitted from the UAV. In some embodiments, the adjustable pivot bracket 1304 may include one, two, three or more brackets, some or all of which may be movable relative to one another. Some or all of the brackets may be moved relative to one another around different axis to provide multiple degrees of freedom. In embodiments, each bracket of the adjustable pivot bracket 1304 may be adjusted by a user manually to change the orientation of the scanning sensor 1310. In other embodiments, each bracket of the adjustable pivot bracket 1304 may be actuated by one or more actuators (e.g., motors, such as AC motors or DC motors). Any number of actuators can be used, such as one, two, three, or more. In some instances, each bracket of the adjustable pivot bracket 1304 can be coupled to a single actuator. Alternatively, a single actuator can be coupled to a plurality of brackets of the adjustable pivot bracket 1304. By way of using actuator(s), any suitable combination of brackets can be used in order to achieve the desired orientation movement of the scanning sensor 1310. The actuator(s) can independently or jointly actuate an orientation movement of the scanning sensor 1310, including movements about one or more axes of rotation (e.g., roll axis, pitch axis, or yaw axis). The movements can cause the scanning sensor 1310 to rotate about one or more corresponding axes of rotation relative to the payload support bracket 1306 to achieve the scanning angle preferred by a user.

The adjustable pivot bracket 1304 can accommodate a variety of scanning angles, as discussed above. In some embodiments, the scanning angle of the sensor payload can be manually or automatically adjustable to multiple different orientations, including 45 degrees or 90 degrees relative to a horizontal plane when the movable object is in landing position. Additionally, or optionally, the scanning angle of the scanning sensor 1310 may be manually or automatically adjusted to multiple different orientations by way of adjusting the one or more brackets of the adjustable pivot brackets 1304 and/or the one or more support components of the mounting assembly, such that the combined effect of each component of the payload assembly and the mounting assembly may orient the scanning sensor at a desired angle. For example, each support component of the mounting assembly 1202 and/or each bracket of the adjustable pivot brackets 1304 may be manually adjusted by a user. In other embodiments, each support component of the mounting assembly 1202 and/or each bracket of the adjustable pivot brackets 1304 may be coupled to one or more actuators/motors triggered by control signals sent from the UAV in communication with a client device or a remote control operated by a user. The control signals comprise user commands to control the actuators or motors, enabling the mounting assembly 1202 and/or the payload assembly to adjust orientation of the scanning sensor 1310 cooperatively.

The payload assembly in the present disclosure is configured to provide one or more structures supporting sensors, processors, communication module and/or other modules. FIGS. 12, 13, 14, 15A, and 15B show some example payload support structures of the payload assembly. The payload support structure may comprise one or more structures formed in different shapes and/or numbers (e.g., a U-shaped cavity structure and/or one or more housing structures) that are configured to accommodate different types of sensors, processors, communication module, and/or other modules within one or more spaces formed by the one or more structures. In one embodiment, as shown in FIG. 13, the payload assembly can include a payload support structure 1308, which include a scanning sensor support and a positioning sensor support structure. In the embodiment, the scanning sensor support includes a U-shaped cavity that is configured to hold or receive at least a portion of the scanning sensor 1310 (e.g., a LiDAR sensor) on one side, while the positioning sensor support includes a space that is configured to accommodate a positioning sensor (e.g., an RTK sensor or an IMU sensor), payload processors, communication module, and/or electronic module. In the embodiment, the positioning sensor located within the space of the positioning sensor support is used to detect a pose of the scanning sensor 1310, such as a LiDAR sensor. The scanning sensor 1310 and the positioning sensor may be jointly supported by the payload support structure 1308 and be placed relatively close to each other. Accordingly, the positioning sensor may conduct a precise detection for the pose of the scanning sensor so as to generate a map with improved quality and precision. Although FIG. 13 shows the payload support structure 1308 having a scanning sensor support and a positioning sensor support back-to-back, the payload support structure 1308 may be formed in other shapes having different number of structure for supporting the scanning sensor, positioning sensors, payload processors, and/or other electronic modules. For example, all of the electronic components, including the scanning sensor, positioning sensors, payload processors, and/or other electronic modules, may be supported by a single payload support structure 1308. For another example, each electronic component or some of the electronic components, including the scanning sensor, positioning sensors, payload processors, and/or other electronic modules, may be supported by different structures (including an enclosed housing with/without windows, a slot or a groove structure for supporting sensors, a housing with some openings on at least one side accommodating sensors/processors/electronic modules, etc.) formed by the payload support structure.

In the embodiment shown in FIG. 13, once the payload assembly is connected to the payload ports, the mapping data obtained from the scanning sensor 1310 supported by the scanning sensor support of the payload support structure 1308, and the positioning data obtained from the positioning sensor located within the positioning sensor support of the payload support structure 1308, may be transmitted to a computing device (such as a mapping manager) of the UAV through the payload ports. In some embodiments, the transmitted positioning data and the mapping data may be unprocessed/minimally processed sensor data obtained directly from the scanning senor and the positioning sensor. In other embodiments, the transmitted positioning data and the mapping data may be post-processed sensor data. In such embodiments, the positioning sensor support of the payload support structure 1308 may further accommodate one or more payload processors (such as a LiDAR processor, a pose processer, and/or other processors), configured for initial sensor data processing before transmitting to the UAV. For example, the LiDAR processor may be provided to compress raw LiDAR data to sparse LiDAR data using down-sampling techniques or other data compression process, such as removing outlier points from mapping data, as discussed above. For another example, the pose processer may be configured to determine poses of the LiDAR sensor during a mapping mission, and correlate the poses of the LiDAR sensor during the course of the mapping mission to each point of the point cloud. The pose processor may conduct the pose determination of the scanning sensor using positioning sensor data (e.g., RTK data, IMU data) obtained by single positioning sensor or combined positioning sensor data obtained from different positioning sensors (e.g., s correlating the RTK sensor data and the IMU sensor data received from the RTK sensor and IMU sensor for each point of the point cloud to generate a combined RTK/IMU data using sensor fusion, so as to improve pose detection for generating a real-time map). In embodiments, GPS data or radio frequency (RF) data received by communication modules of the UAV may be transmitted to the pose processor via the payload port for obtaining the enhanced RTK sensor data. In other embodiments, GPS data and RF data may be received by communication modules supported by the payload assembly and be transmitted to the pose processor for obtaining the enhanced RTK sensor data. In addition to LiDAR processor and pose processor, the positioning sensor support of the payload support structure 1308 may accommodate other payload processors configured to conduct initial sensor data processing. For example, the positioning sensor support of the payload support structure 1308 may accommodate a payload processor configured to correlate the mapping data and the positioning data using time data for synchronization. As discussed above, the time data may be associated with a shared clock signal obtained from a shared clock circuitry coupled to the positioning sensor and/or the scanning sensor. These post-processed sensor data, such as compressed mapping data, combined RTK/IMU data through sensor fusion, and/or associated mapping data and positioning data, may be transmitted to the computing device (such as a mapping manager) of the UAV via the payload ports for map generation or further computation.

In some embodiments, a mirror or a plate with a reflective coating material may be installed on the scanning sensor (e.g., a LiDAR sensor) at a certain angle that overlaps with at least a portion of the FOV of the LiDAR sensor in use. By way of applying the mirror or the plate with the reflective coating material, the FOV of the LiDAR may be broadened to include a second FOV that is created by laser lights illuminated from the LiDAR that are being reflected by the mirror or the plate with the reflective coating material.

Figure 14:
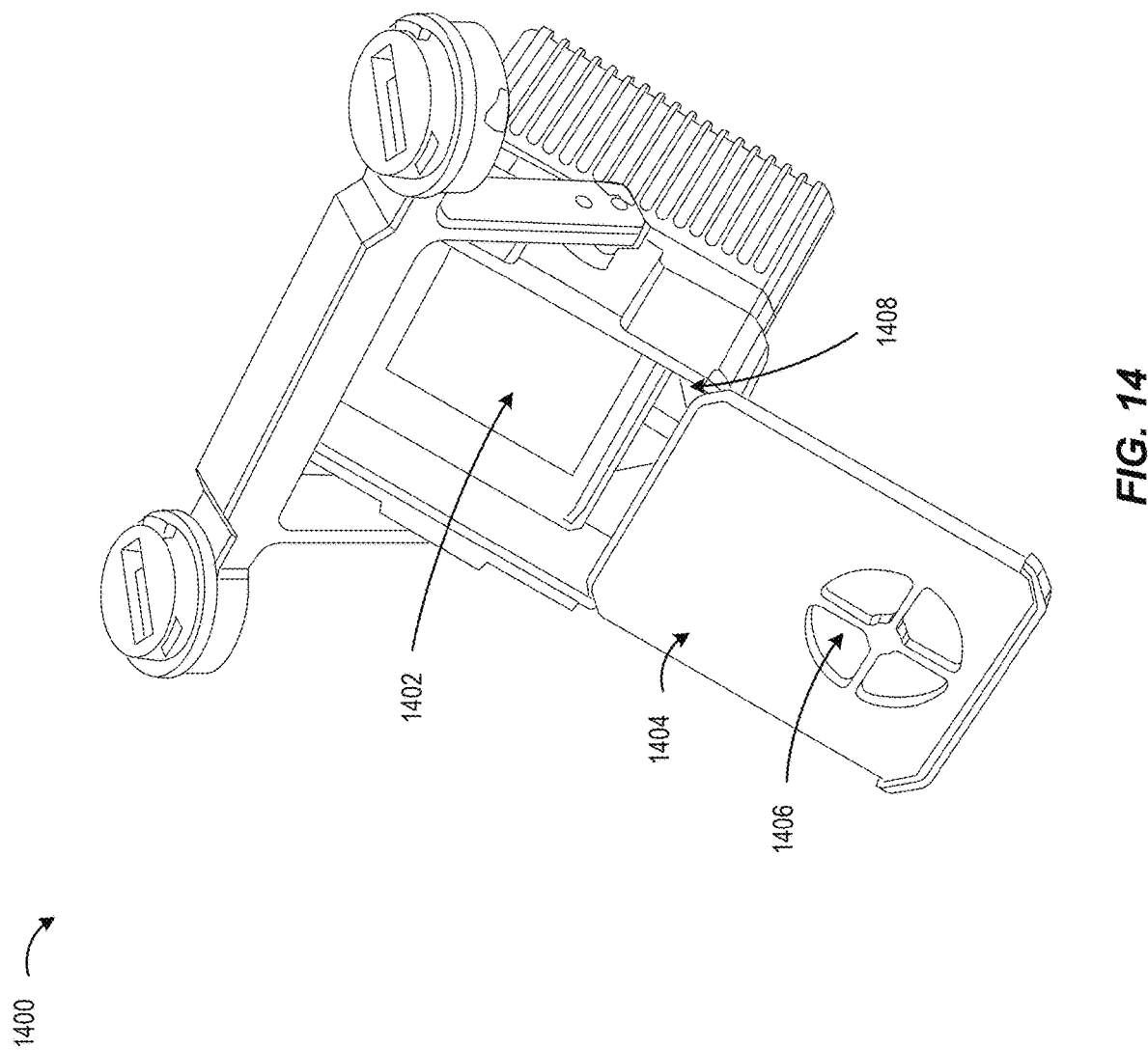
FIG. 14 shows an isometric view of an alternative payload assembly, in accordance with an embodiment.

FIG. 14 shows an isometric view of an alternative payload assembly, in accordance with an embodiment. Similar to FIG. 13, the payload assembly can include a payload support bracket, adjustable pivot brackets, and a payload support structure, as discussed above. The payload support structure may include a scanning sensor support and a positioning sensor support structure. The scanning sensor support includes a U-shaped cavity that is configured to hold or receive the scanning sensor (e.g., a LiDAR sensor) on one side, while the positioning sensor support includes a space 1402 that is configured to accommodate a positioning sensor (e.g., an RTK sensor or an IMU sensor). In embodiments, the positioning sensor located within the positioning sensor support is used to detect a pose of the scanning sensor, such as a LiDAR sensor. The scanning sensor and the positioning sensor may be jointly supported by the payload support structure and be placed relatively close to each other. Accordingly, the positioning sensor may conduct a precise detection for the pose of the scanning sensor, so as to generate a map with improved quality and precision.

The positioning sensor support may further include a positioning sensor enclosure 1404. The positioning sensor enclosure 1404 may provide a mechanism, such as a sliding mechanism, to expose the space 1402 of the positioning sensor support for the user to place or change the type of positioning sensor (e.g., an RTK sensor or an IMU sensor), and/or the type of payload processor (e.g., a pose processor or a LiDAR processor) preferred by the user to support a customized mapping mission. As shown in FIG. 14, the positioning sensor enclosure 1404 may be a lid-shaped structure that is slidable along a predetermined trajectory provided by the positioning sensor support. The lid may further include a stopper 1408 on one end, such that when the lid is being slid to expose the space 1402, the stopper 1408 may secure the lid from detaching the positioning sensor support structure. The space 1402 of the positioning sensor support can accommodate various components disposed therein, including various positioning sensor, processors, and/or any other electronic modules. Various components may be fit into the space 1402, and be releasably or fixed attached to the positioning sensor support via any suitable attachment structure/mechanisms. For example, some of the components may be attached to the positioning sensor support using straps, Velcro, cables, plugs, compartments within the enclosure fitting the size of the components, etc. In one instance, some electronic components (such as RTK module, IMU module, pose processor, LiDAR processor, etc.) may be connected to the positioning sensor support structure using interface connectors (e.g., pluggable connectors, cable connectors, etc.) come with the positioning sensor support and located within one or more inner surfaces or compartments of the space 1402. In such embodiment, when needed, a user may expose/open the space 1402 by sliding the positioning sensor enclosure 1404, detach one or more electronic components by disconnecting the interface connectors (e.g., unplugging the electronic components from the pluggable connector or cable connectors) for different purposes (e.g., for debugging or repairing purposes, for replacing different types of positioning sensors, for removing or adding electronic components to be disposed within the space 1402, etc.).

In embodiments, the positioning sensor enclosure 1404 can protect the positioning sensor or the payload processors(s) that are located within the space 1402 from the elements and/or electromagnetic interference. The positioning sensor enclosure 1404 provides ingress protection (IP) for the electronics located within the space 1402 of the positioning sensor support from foreign debris and moisture. In some embodiments, the positioning sensor enclosure 1404 may include a coating comprising conductive shielding materials, such as copper, nickel, aluminum, or steel. In such embodiments, the positioning sensor enclosure 1404 may be sprayed with a thin layer of coating paint or other substance, including copper, nickel, aluminum, or steel, to protect the positioning sensor from jamming caused by electromagnetic interference. In some embodiments, the positioning sensor enclosure 1404 may include a Faraday cage with various circular cutouts to prevent the positioning sensor from jamming due to electromagnetic interference. The size and locations of the circular cutouts may be selected for the frequency or frequencies of electromagnetic interference that are expected and/or those frequencies most likely to interfere with the functioning of the positioning sensor. In some embodiments, the positioning sensor enclosure 1404 may further include one or more windows 1406 configured to dissipate heat generated by the positioning sensor, payload processors, or any other electronic components disposed therein during operation.

Figure 15B:
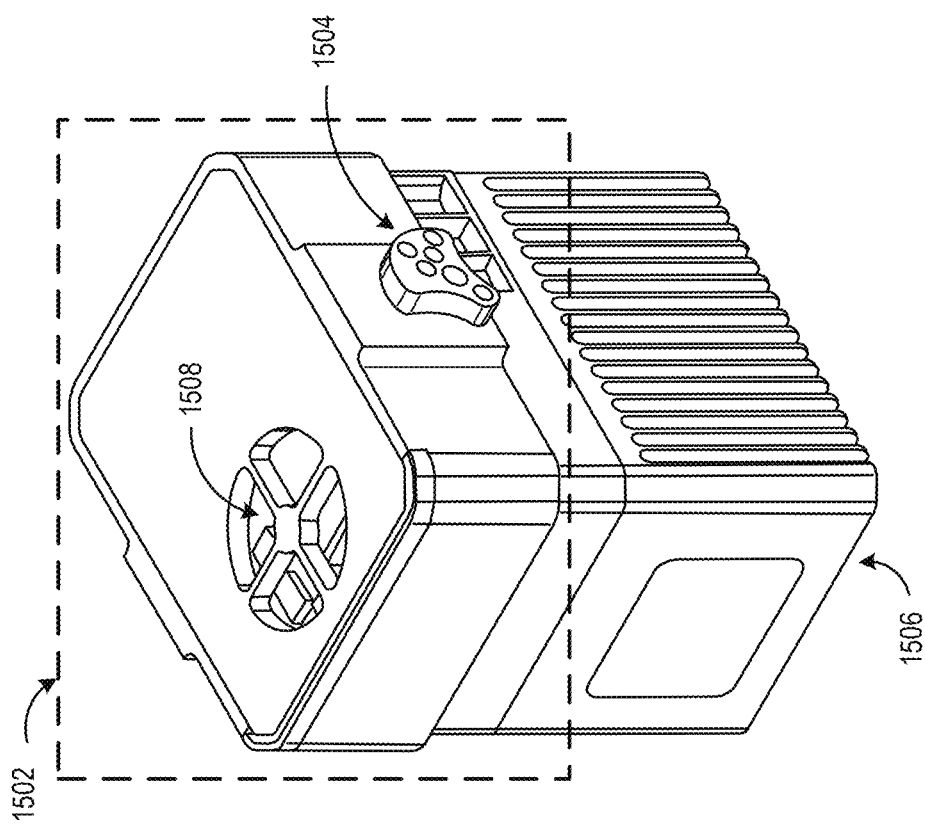
FIG. 15B shows an isometric view of an adjustable pivot bracket and a payload support structure, in accordance with an embodiment.
Figure 15A:
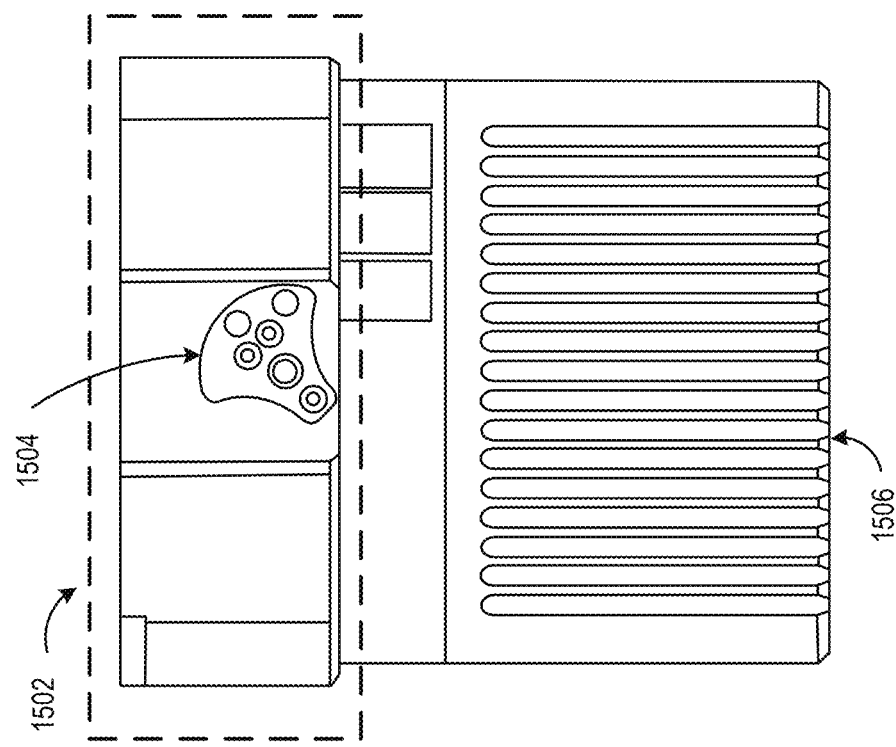
FIG. 15A shows a side view of an adjustable pivot bracket and a payload support structure, in accordance with an embodiment.

FIG. 15A shows a side view of an adjustable pivot bracket and a payload support structure, in accordance with an embodiment. The mounting assembly includes a payload assembly bracket (not shown), adjustable pivot brackets 1504, and a payload support structure 1502, as shown in FIG. 15A. As discussed above, the payload support structure 1502 may include a scanning sensor support on one side (shown as the lower side supporting the scanning sensor 1506 in FIG. 15A) and a positioning sensor support structure on the other side (shown as the upper housing structure formed by the payload support structure 1502 in FIG. 15A). In embodiments, the scanning sensor support includes a U-shaped cavity that is configured to hold or receive the scanning sensor 1506 (e.g., a LiDAR sensor) on the lower side of the payload support structure 1502, while the positioning sensor support includes a space that is configured to accommodate one or more positioning sensor(s) (e.g., an RTK sensor or an IMU sensor) on the upper portion of the payload support structure 1502. In embodiments, the positioning sensor located within the positioning sensor support is used to detect a pose of the scanning sensor 1506 (e.g., a LiDAR sensor). The scanning sensor 1506 and the positioning sensor may be jointly supported by the payload support structure 1502 and be placed relatively close to each other. Accordingly, the positioning sensor may conduct a precise detection for the pose of the scanning sensor, so as to generate a map with improved quality and precision.

In embodiments, adjustable pivot brackets 1504 may include a bracket that may be rotated clockwise or counter-clockwise around an axis of ration (e.g., roll axis, pitch axis, or yaw axis), such that the scanning sensor 1506 may be rotated clock wise or counter-clockwise accordingly around the axis of rotation. In some embodiments, adjustable pivot brackets 1504 may include multiple brackets, each bracket of a subset of the multiple brackets may be rotated around different axis of ration (including a roll axis, pitch axis, and/or yaw axis), such that the scanning sensor 1506 may be rotated around a plurality of axis creating more degrees of freedom for orienting the scanning sensor 1506.

In embodiments, the payload support structure 1502 may further accommodate one or more payload processors located within the positioning sensor support of the payload support structure 1502 that are configured to conduct initial sensor data processing using various signal processing techniques, such as sensor fusion, data compression, etc. For example, the one or more payload processors may include a pose processor, which is configured to determine a pose of the scanning sensor using positioning data obtained by a single positioning sensor or combined positioning data obtained by various positioning sensors using sensor fusion (e.g., combining RTK data and IMU data using sensor fusion to generate combined RTK/IMU data). For another example, the one or more payload processors may include a LiDAR processer, which is configured to transform raw LiDAR data obtained by the LiDAR sensor into sparse LiDAR data using outlier removal process, as discussed above. For another example, the one or more payload processors may be configured to associate positioning data obtained from the positioning sensor and mapping data obtained from the LiDAR sensor using time data, as discussed above. In some embodiments, the raw sensor data processed by the one or more payload processors located within the positioning sensor support of the payload support structure 1502 may be transmitted to the computing device, such as a mapping manager, located within the main body of the UAV via payload port(s) for further computation or map generation.

FIG. 15B shows an isometric view of an adjustable pivot bracket and a payload support structure, in accordance with an embodiment. The mounting assembly includes a payload assembly bracket (not shown), adjustable pivot brackets 1504, and a payload support structure 1502, as shown in FIG. 15B. Detailed description of the adjustable pivot bracket and the payload support structure is discussed in FIG. 15A above. In some embodiments, the intersection between the scanning sensor 1506 and the scanning payload support, and/or between the scanning payload support and the positioning payload support, may be any kind of shapes instead of square, such as rectangular, circle, elliptical, triangle, etc. In embodiments, the positioning sensor support of the payload support structure 1502B may further include one or more windows 1508 configured to dissipate heat generated by the positioning sensor, payload processors, or any other electronic components disposed therein during operation.

Figure 16:
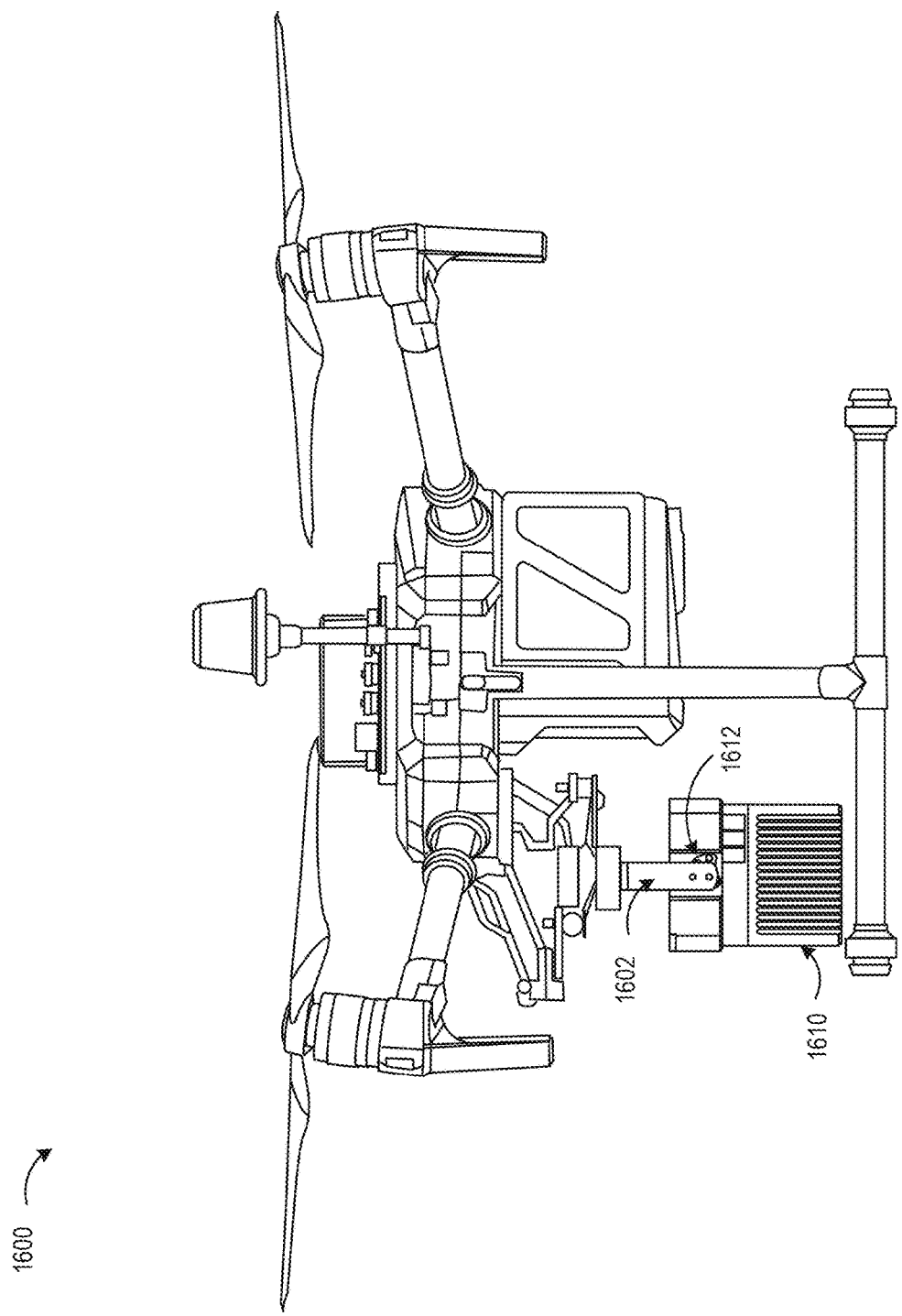
FIGS. 16-18 show examples of angled positions of a scanning sensor coupled to a movable object via a payload assembly, in accordance with various embodiments.
Figure 17:
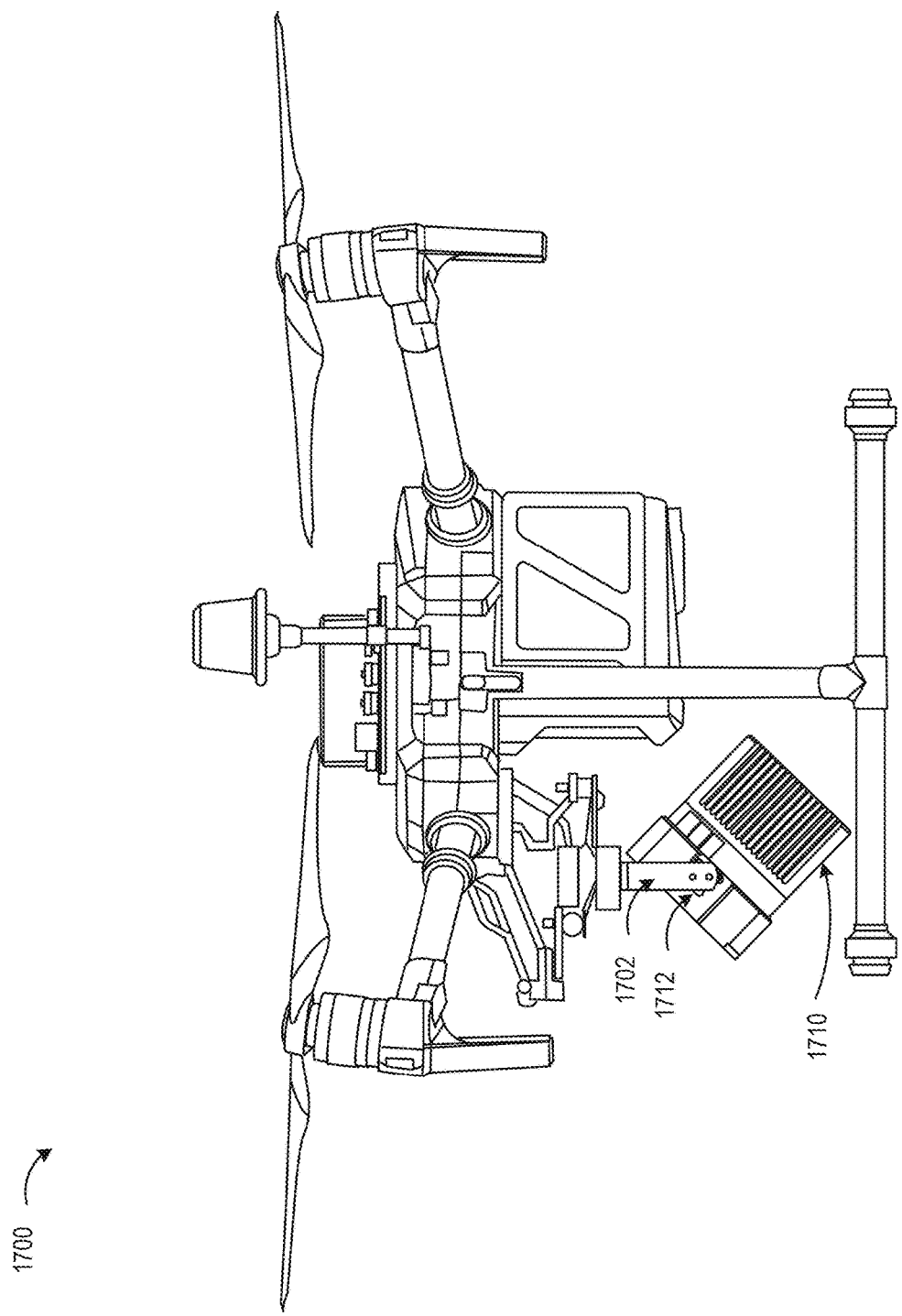
Figure 18:
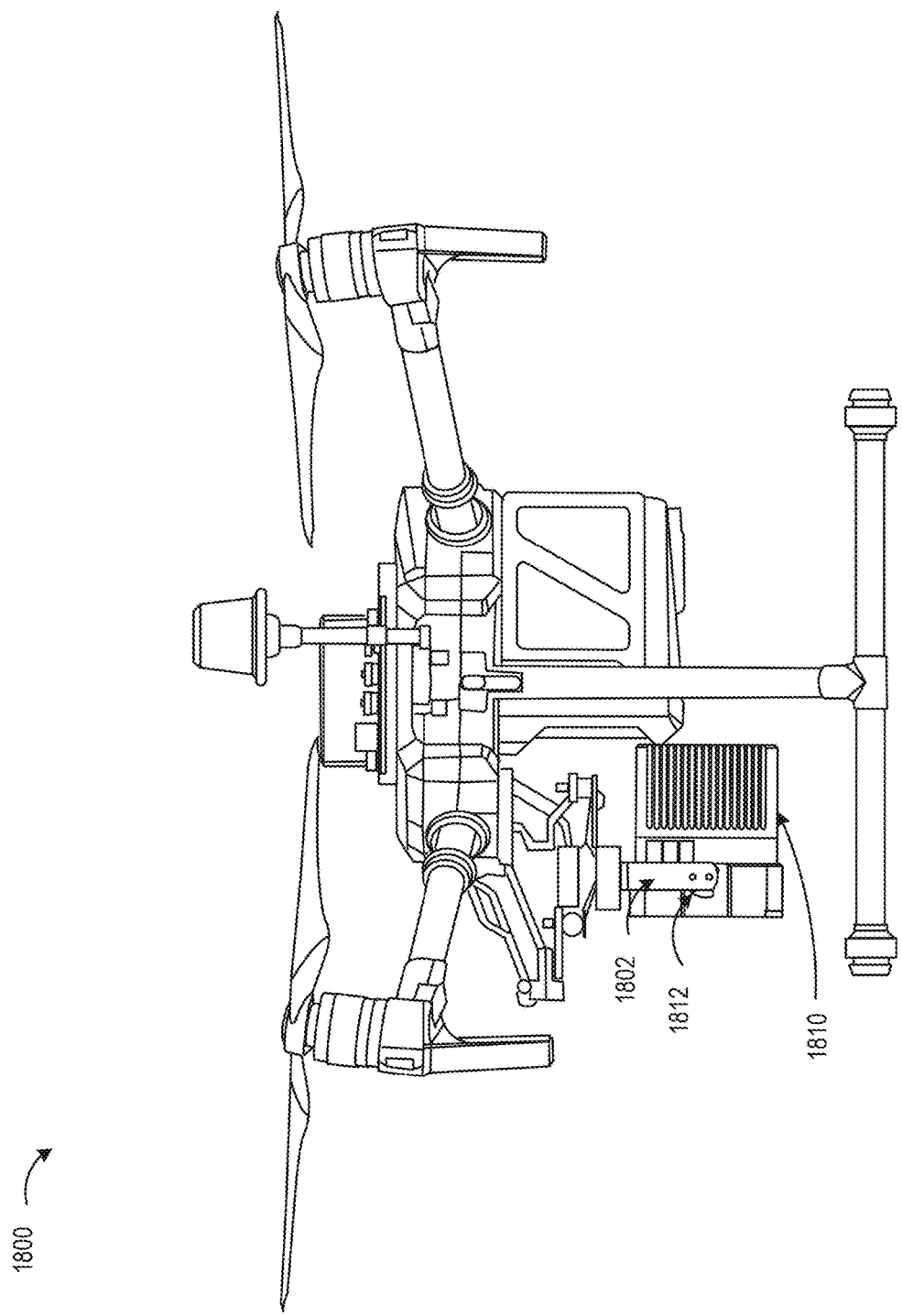

FIGS. 16-18 show examples of angled positions of a scanning sensor coupled to a movable object via a payload assembly, in accordance with various embodiments. FIGS. 16-18 show examples of angled positions of a scanning sensor coupled to a movable object, in accordance with various embodiments. In the example 1600 shown in FIG. 16, the LiDAR 1610 can be positioned at 0 degrees relative to horizontal. As discussed above, this position can be achieved using the adjustable pivot bracket 1612 and the payload support brackets 1602. In the example 1700 shown in FIG. 17, the LiDAR 1710 can be positioned at 45 degrees relative to horizontal. This angle position may also be achieved using the payload support brackets 1702 and the adjustable pivot bracket 1712, by aligning corresponding holes in the brackets for the 45-degree position, as discussed in FIG. 13. Similarly, the example 1800 shown in FIG. 18 shows the LiDAR 1810 positioned at 90 degrees relative to horizontal. As discussed above, this position may be achieved by changing the alignment of holes in the adjustable pivot bracket 1812 to corresponding holes in the payload support bracket 1802. In some embodiments, rather than holes which provide predefined angular positions, the payload support brackets 1802 may include slots, which enable the user to select various angular positions. In addition to orienting the adjustable pivot bracket in FIGS. 16-18 manually by user, the scanning sensor may be oriented automatically using control signals transmitted from the UAV to one or more actuators/motors controlling one or more components of the mounting assembly and/or the payload assembly (including the adjustable pivot bracket) to achieve desired scanning angle or scanning position, as discussed above. By way of using actuators/motors, any suitable combination of components provided by the mounting assembly and payload assembly can be used to achieve the desired orientation of the scanning sensor. The actuators/motors can independently or jointly actuate any orientation movement of the scanning sensor, including movements about one or more axes of rotation (e.g., roll axis, pitch axis, or yaw axis). The movements can cause the scanning sensor to rotate about one or more corresponding axes of rotation so as to achieve the scanning angle position, shown in FIGS. 16-18, preferred by a user.

Figure 19:
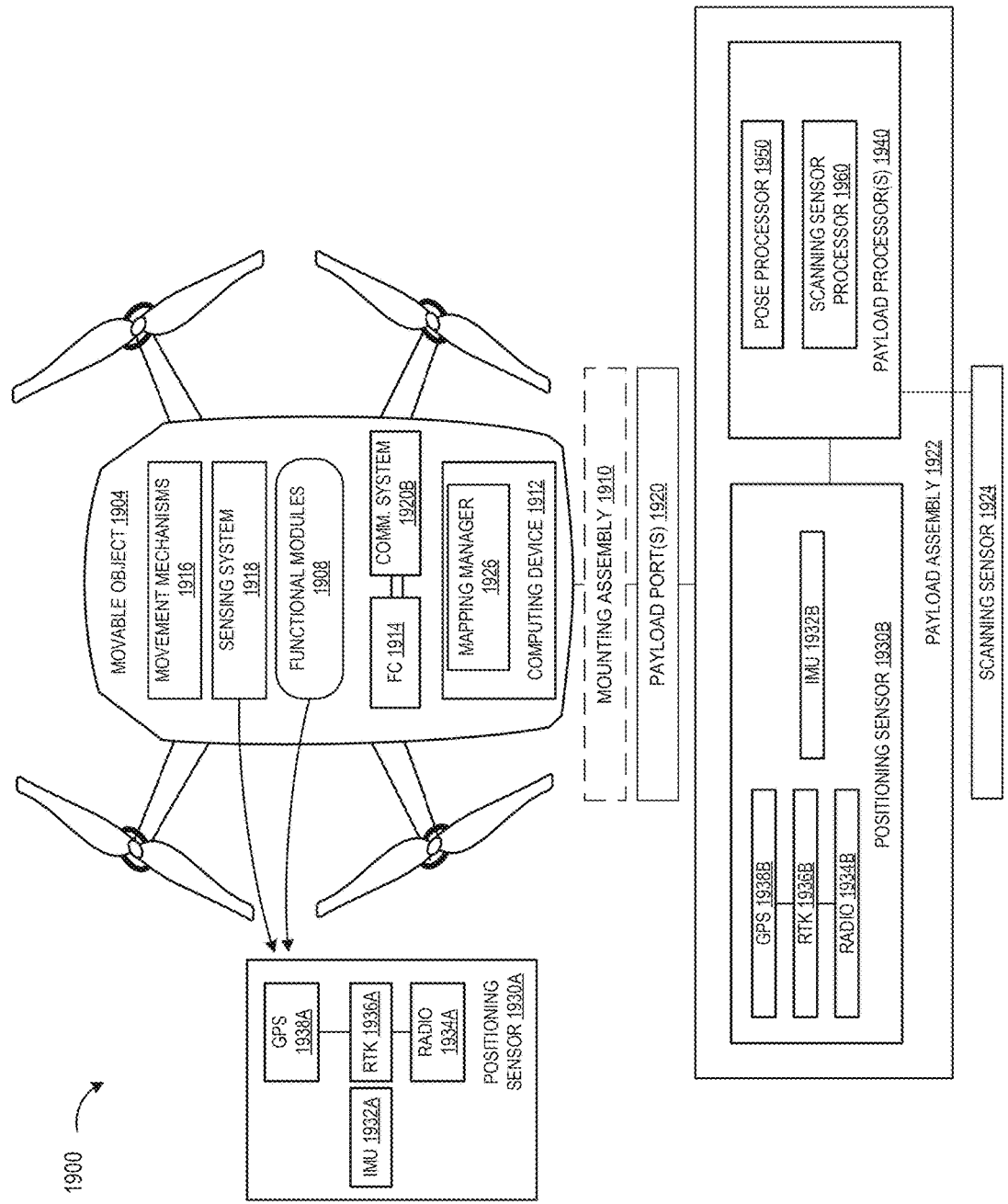
FIG. 19 shows example components that may be implemented on a payload assembly coupled to payload ports provided by a movable object in a movable object environment, in accordance with various embodiments.

FIG. 19 shows example components that may be implemented on a payload assembly 1922 coupled to payload ports 1920 provided directly by a movable object 1904 or via a mounting assembly 1910 in a movable object environment 1900, in accordance with various embodiments. In embodiments, the movable object 1904 can be an unmanned aircraft, an unmanned vehicle, a handheld device, and/or a robot, configured to conduct mapping mission. In accordance with various embodiments, the movable object 1904 may include electronic components, including one or more movement mechanisms 1916 (e.g., propulsion mechanisms), a sensing system 1918, function modules 1908, flight control

1914, a communication system 1920B, and a computing device 1912 including a mapping manager 1926. The detailed description of each component is described above in FIG. 1.

In various embodiments, movable object 1904 in a movable object environment 1900 can be coupled to a payload assembly 1922 via payload ports 1920 (Or optionally, via mounting assembly 1910 and payload ports 1920). The payload assembly 1922 supports various sensors, including a scanning sensor 1924 (e.g., a LiDAR sensor) and a positioning sensor 1930B (e.g., a GPS sensor 1938B, an RTK sensor 1936B, an RF sensor 1934B, and/or an IMU sensor 1932B). Although the movable object 1904 is described generally as an aircraft, this is not intended to be limiting, and any suitable type of movable object can be used. One of skill in the art would appreciate that any of the embodiments described herein in the context of aircraft systems can be applied to any suitable movable object (e.g., a UAV).

In some embodiments, raw scanning sensor data collected by the scanning sensor 1924 and raw positioning data collected by the positioning sensor 1930B supported by the payload assembly 1922 may be transmitted to the mapping manager 1926 via payload port 1920 for map generation. In other embodiments, the payload assembly 1922 may include one or more payload processor(s) 1940 coupled to the scanning sensor 1924 and/or the positioning sensor 1930B, such as a pose processor 1950 or a scanning sensor processor 1960, shown in FIG. 19. The payload processor(s) 1940 may perform initial sensor data processing and send the post-processed sensor data to the mapping manager 1926 via payload ports 1920.

For example, the pose processor 1950 is coupled to the positioning sensor 1930B for receiving raw positioning sensor data for pose determination of the scanning sensor 1924. In embodiments, the pose processor 1950 may receive positioning sensor data (e.g., RTK data, IMU data obtained from a single positioning sensor and use the positioning sensor data for pose determination. In other embodiments, the pose processor 1950 may combine the received positioning sensor data to generate combined positioning sensor data using sensor fusion, such as combining RTK data and IMU data to generate combined RTK/IMU data for determining an orientation or a pose of the scanning sensor 1924. The pose processor 1950 performs sensor fusion to combine RTK data and IMU data for generating an enhanced RTK/IMU data before transmitting to the mapping manager 1926 via payload ports 1920. For another example, the scanning sensor processor 1960 is coupled to the scanning sensor 1924 for receiving raw scanning sensor data, such as raw LiDAR data. In embodiments, the scanning sensor processor 1960 may receive raw mapping data (e.g., raw LiDAR data) and perform data compression to generate sparse mapping data (e.g., sparse LiDAR data) using outlier point removal or downsampling processes. For another example, the payload processors 1940 may include a processor that is configured to receive positioning data from the positioning sensor 1930B and mapping data from scanning sensor 1924. In such an example, the processor may associate the positioning data with the mapping data using time data, where the time data may be provided by a clock circuitry generating a reference clock signal shared by the positioning sensor 1930B and the scanning sensor 1924 for synchronization. The post-processed sensor data described above, such as the RTK/IMU data, the sparse mapping data, and/or the associated positioning data and the mapping data, may then be transmitted to the mapping manager 1926 via payload ports 1920 for map generation.

In some embodiments, the payload assembly 1922 may only support a scanning sensor 1924, while the movable object 1904 supports a positioning sensor 1930A (e.g., a GPS sensor 1938A, an RTK sensor 1936A, an RF sensor 1934A, and/or an IMU sensor 1932A) in its onboard sensing system 1918, function module 1908, or a separate module that is coupled to the movable object 1904. The positioning sensor data provided by the onboard positioning sensor 1930A can be directly provided to the mapping manager 1926 within the movable object, while the mapping data obtained by the scanning sensor 1924 is provided to the mapping manager 1926 via the payload ports 1920. The mapping manager 1926 may associate the positioning data received from the positioning sensor 1930A and the mapping data received from the payload assembly for real-time map generation.

In other embodiments, the movable object 1904 and the payload assembly 1922 may both provide positioning sensors with different types for collecting different types of positioning data. In such embodiments, the different types of positioning data collected by the movable object 1904 and the payload assembly 1922 can be communicated and exchanged via payload ports 1920. For example, the onboard positioning sensor 1930A (supported by the UAV) may include a GPS module 1938B and an RF module 1934A, while the positioning sensor 1930B (supported by the payload assembly 1922) may include an RTK module 1936B and a IMU module 1932B. In such an example, the onboard positioning sensor 1930A may transmit the GPS data received by the UAV from satellites and RF data received by the UAV from ground base stations to the RTK module 1936B (supported by the payload assembly 1922) via the payload ports 1920. In such embodiments, the GPS data and the RF data may be used by the RTK module 1936B (supported by the payload assembly 1922) to generate enhanced positioning data. The enhanced positioning data may be transmitted back to the movable object 1904 via the payload ports 1920, or be transmitted to the payload processors 1940 for further processing (such as combining the enhanced positioning data with the IMU data obtained from the IMU module 1932B using sensor fusion) before transmitting back to the movable object 1904 via the payload ports 1920 for map generation. In other embodiments, any combination of the types of positioning sensors can be disposed on the onboard positioning sensor 1930A (supported by the UAV) or the positioning sensor 1930B (supported by the payload assembly 1922). Different types positioning data obtained by the UAV or the payload assembly 1922 may then be communicated or exchanged using the payload ports 1920.

In various embodiments, the movable object 1904 comprises a computing device 1912 including a mapping manager 1926. In some embodiments, an application executed on client device or remote control can provide control data to the movable object 1904 to conduct a mapping mission and to generate a map. In embodiments, the map may be generated based on the scanning sensor data and the positioning data. The scanning sensor data may be obtained from the scanning sensor 1924 supported by the payload assembly 1922 via payload ports 1920, and the positioning data may be obtained from the positioning sensor 1930B supported by the payload assembly 1922 via payload ports 1920 or obtained directly from the positioning sensor 1930A supported by the movable object 1904, as discussed above.

In some embodiments, the control data can be provided to mounting assembly 1910 and/or payload assembly 1922. The control data may result in a modification of the location and/or orientation of the scanning sensor 1924 (e.g., via control of the support components of the mounting assembly 1910 and/or the adjustable pivot brackets of the payload assembly 1922). The control data from the application may result in control of the payload, such as control of the operation of scanning sensor 1924, a camera or other image capturing device (e.g., taking still or moving pictures, zooming in or out, turning on or off, switching imaging modes, changing image resolution, changing focus, changing depth of field, changing exposure time, changing viewing angle or field of view of the scanning sensor 1924, changing scanning pattern, scanning rate or frequency of the scanning sensor 1924).

In some embodiments, mapping manager 1926 can be used to provide LiDAR-based real-time mapping for various applications, such as construction, surveying, target inspection, etc. In embodiments, the mapping manager 1926 may conduct real-time mapping rendering on a client device. Such live rendering may enable the user to determine if any areas within the target environment have not been scanned by scanning sensor 1924. Additionally, another version of the map may be downloaded and used upon return of the movable object 1904. In various embodiments, the mapping manager 1926 may utilize a parallel computing architecture in computing device 1912 to perform the real-time mapping.

In some embodiments, the mapping manager 1926 may perform data compression to transform a dense map into a sparse map to be rendered on client device. By way of compressing the dense map into the sparse map, the mapping manager 1926 may be used to reduce data size required for transmission from the movable object 1904 to the client device, and thus, data transmission time and bandwidth are saved for efficient real-time map rendering. In such embodiments, the live rendering of the map may be a lower resolution version or a compressed data version of the map (i.e., a sparse map) compared to the version obtained from the movable object upon its return from scanning the target environment (i.e., a dense map). In some embodiments, the mapping data may be output as a LiDAR Data Exchange File (LAS) which may be used by various tools to render the map of the target environment and/or use the mapping data for further processing, planning, etc. Metadata embedded in the LAS output file can facilitate integration of the map with various third-party tools. In various embodiments, the map may be output in various file formats depending on user preferences. In other embodiments, a payload processor 1940 discussed above that is supported by the payload assembly 1922 may perform data compression instead. In such embodiments, the compressed data generated by the payload processor 1940 may be sent to the mapping manager 1926 via payload ports 1920 for further computation.

In various embodiments, the mapping data generated by the mapping manager 1926 can be geo-referenced using the positioning data, received from the positioning sensor 1930A and/or 1930B, and used to construct the map of the target environment. Prior methods of 3D mapping have relied on complex environments that are conducive to scan-matching. Unlike prior mapping systems, which require complex environments in order to use scan-matching to prepare the map, embodiments objectively geo-reference the mapping data. This allows for various target environments to be mapped regardless of environment complexity.

Figure 20:
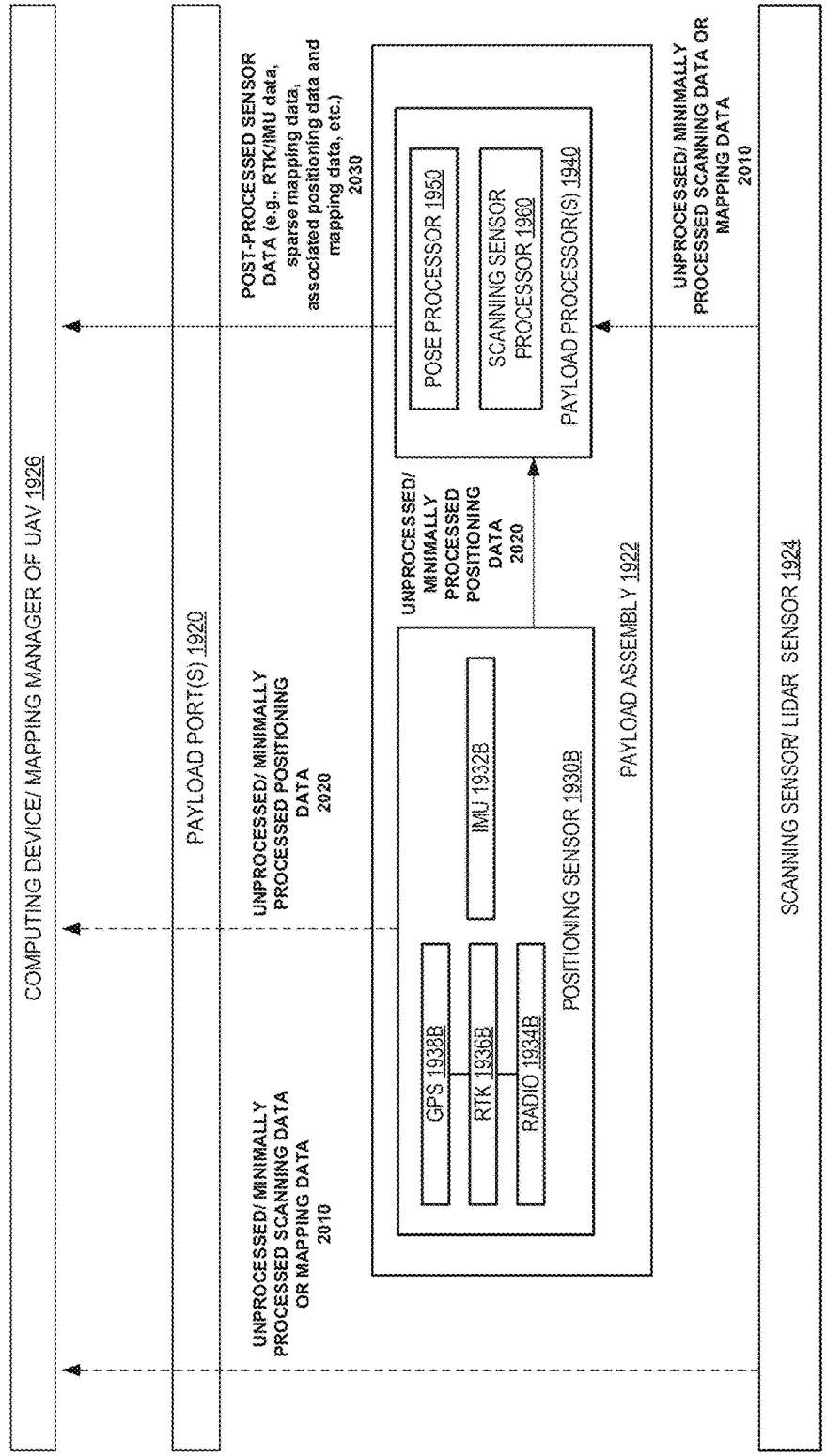
FIG. 20 shows an example signal diagram of a movable object environment, in accordance with an embodiment.

FIG. 20 shows an example signal diagram of a movable object environment, in accordance with an embodiment.

As discussed above in FIG. 19, the mapping manager 1926 of the UAV, may receive unprocessed/minimally processed sensor data 2010, 2020 and/or post-processed sensor data 2030 that is processed by the payload processor 1940. In some embodiments, the mapping manager 1926 may receive unprocessed/minimally processed scanning data or mapping data 2010 collected by the scanning sensor 1924 (e.g., a LiDAR sensor) via the payload port 1920. The mapping manager 1926 may also receive unprocessed/minimally processed positioning data 2020 collected by the positioning sensor 1930B via the payload ports 1920. In such embodiments, the mapping manager 1926 may further associate the unprocessed/minimally processed scanning data or mapping data 2010 with the unprocessed/minimally processed positioning data 2020 using time data. The mapping manager may also perform data compression to transform the unprocessed/minimally processed scanning data or mapping data 2010 into sparse mapping data for real-time map rendering.

In other embodiments, the unprocessed/minimally processed scanning data or mapping data 2010 collected by the scanning sensor 1924 (e.g., a LiDAR sensor) and the unprocessed/minimally processed positioning data 2020 collected by the positioning sensor 1930B, before transmitting to the mapping manager 1926 via the payload ports 1920, may firstly be transmitted to the payload processor 1940 for initial processing. The payload processor(s) 1940 may include one or more processors, such as a pose processor 1950, or a scanning sensor processor 1960, etc., for performing initial data processing.

For example, the pose processor 1950 may be configured to determine a pose of scanning sensor using positioning data (e.g., RTK data, IMU data) obtained from a single positioning sensor or using combined positioning sensor data obtained from various positioning sensors using sensor fusion. For example, the pose processor 1950 may use sensor fusion to combine RTK data (including RTK data enhanced by GPS data and RF data detected by the GPS module 1938B and the RF module 1934B supported by the payload assembly 1922, or RTK data enhanced by the GPS module 1938A and the RF module 1934A coupled to the UAV and transmitted to the payload assembly 1922 via payload ports 1920) detected by the RTK module 1936B and IMU data detected by the IMU module 1932B to generate combined RTK/IMU data 2030. For another example, the scanning sensor processor 1960 may be configured to transform the unprocessed/minimally processed scanning data or mapping data 2010 received from the scanning sensor 1924 into sparse mapping data 2030 using downsampling, outlier point removal, or other data compression techniques. For another example, the payload processor 1940 may further include other processors, such as a processer configured to associate unprocessed/minimally processed positioning data 2020 received from the positioning sensor 1930B and unprocessed/minimally processed scanning data or mapping data 2010 received from the scanning sensor 1924 to generate associated positioning data and mapping data 2030. In embodiments, these post-processed sensor data 2030 (such as combined RTK/IMU data, sparse mapping data, and associated positioning data and mapping data) may be transmitted to the mapping manager 1926 of the UAV via payload ports 1920 for real-time map generation. Through the initial data processing using the payload processors 1940, the data size and quality to be transmitted from the payload assembly to the computing device, such as a mapping manager, of the UAV may be efficiently improved. The real-time map rendered on the client device may be faster with better quality, and thus improve user experience.

For another example, the pose processor 1950 may generate estimated pose based on positioning sensor data (e.g., GPS data/RTK data/IMU data) obtained from a single positioning sensor or enhanced positioning sensor data obtained from various positioning sensors using sensor fusion. This estimated pose is transmitted to the computing device (e.g., a mapping manager) coupled to the UAV from the pose processor 1950. In the meanwhile, the scanning sensor processor 1960 may generate post-processed scanning sensor data from unprocessed or minimally processed scanning sensor data (e.g., by removing noise or error). The post-processed scanning sensor data is also transmitted to the computing device (e.g., a mapping manager) coupled to the UAV from the scanning sensor processor 1960. Upon receiving the estimated pose and the post-processed scanning sensor data, the computing device (e.g., a mapping manager may: (1) correlate the estimated pose with the post-processed sensor data based on time data (e.g., timestamp, shared reference clock signal provided by clock circuitry); and/or (2) compress the post-processed scanning data for any purposes, including for transmission from the UAV to a client device/remote control or any computing entity, for rendering to a display of a client device/remote control or any computing entity, for storage in a local/remote/cloud database or any other data storage repository, etc. The correlation process described in (1), the data compression process described in (2), or both (1) and (2) processes, may be performed by one or more processors coupled to the UAV collocated with the payload assembly to improve efficiency (e.g., reduce latency or cost associated with data transmission).

Figure 21:
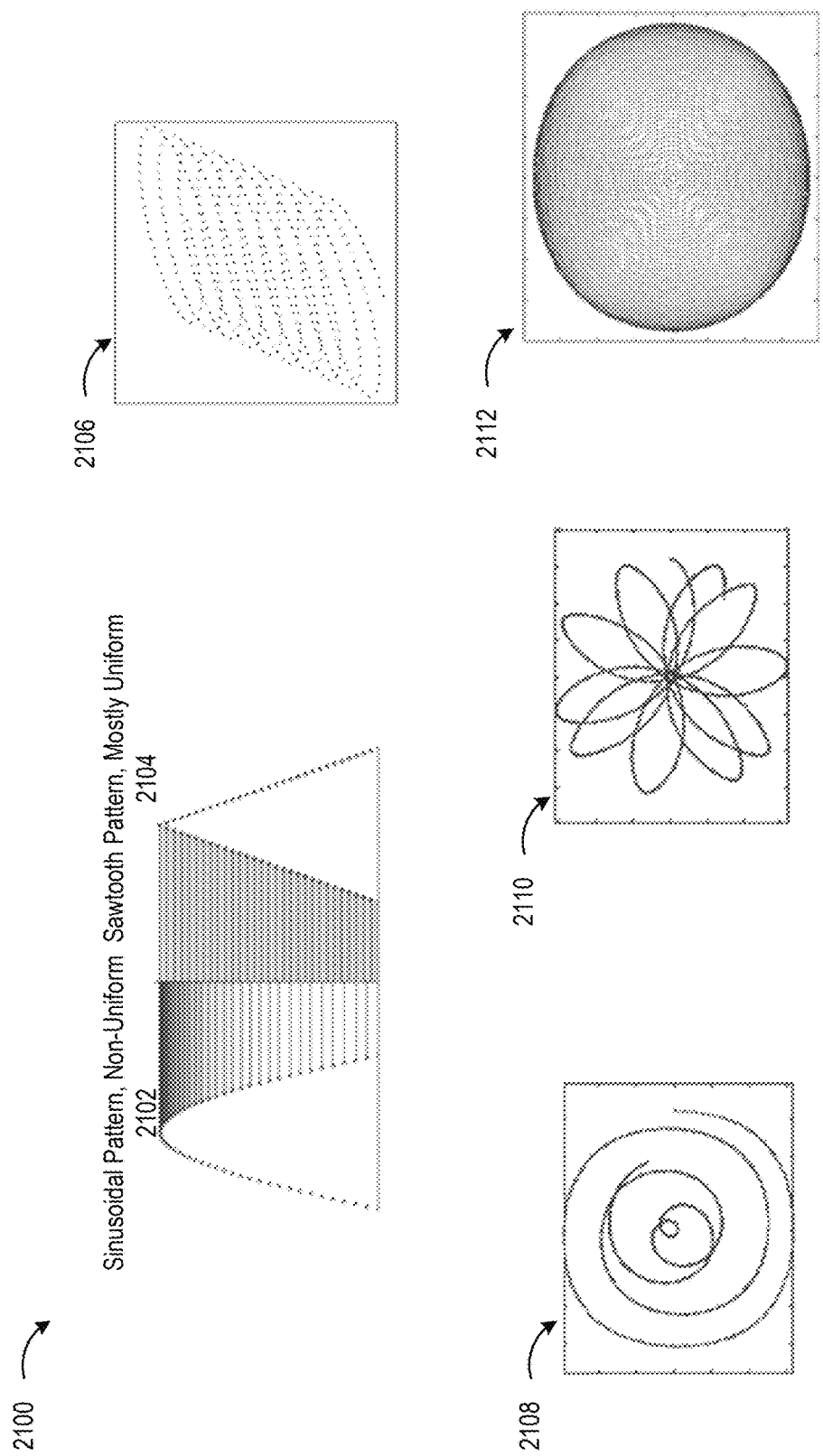
FIG. 21 shows example scanning patterns that may be implemented by LiDAR sensors that may be used in various embodiments.

FIG. 21 shows example scanning patterns 2100 that may be implemented by LiDAR sensors that may be used as a scanning sensor in various embodiments. A LiDAR system is an active sensing system that emits light beams and measures a two-way travel time (i.e. time-of-flight) for the reflected light detected by the LiDAR sensor. The collected sensor data may generally be used to measure a range or a distance to an object which has reflected the light emitted by the LiDAR. Further, the object's position in a three-dimensional space (e.g., recorded with x-, y-, and z-coordinates, or latitude, longitude, and elevation values, or other coordinate systems, etc.) may be determined using (1) the detected two-way travel time of the emitted light beam, (2) the scan angle of the light beam in reference to the three-dimensional space, and/or (3) the absolute location of the LiDAR sensor detected using a GPS, GNSS, INS or IMU sensor, etc.

Different LiDAR sensors may be associated with different scan patterns, scan frequencies, and/or scan angles. The scan patterns of a LiDAR sensor can be virtually any waveform by way of utilizing different scanning mechanisms (e.g., using a constant-velocity rotating polygon mirror or an oscillating mirror). Some examples of scan patterns include parallel scan lines, which may be generated by a rotating polygon mirror, or sawtooth scan lines which may be generated by an oscillating mirror. Other examples may include a sinusoidal scan pattern 2102, sawtooth scan pattern 2104, elliptical scan pattern 2106, spiral scan pattern 2108, or flower shape scan pattern 2110, or uniform scan pattern 2112 (which may be a series of concentric scans, such as circular, oval, or other scan shapes).

LiDAR data may be collected or recorded as discrete points or as a full waveform. Discrete points identify and record points at each peak location in the waveform curve. A full waveform records a distribution of returned energy and thus captures more information compared to discrete points. Whether collected as discrete points or full waveform, LiDAR data are available as discrete points, which is known as a LiDAR point cloud. LiDAR point cloud is usually stored as .las format (or .laz format, which is a highly compressed version of .las). Each lidar point data and its metadata may include various data attributes, such as associated coordinate values, an intensity value representing the amount of light energy recorded by the sensor, or classification data representing the type of object the laser return reflected off of (such as classified as ground or non-ground), etc.

Many features can be performed in, using, or with the assistance of hardware, software, firmware, or combinations thereof. Consequently, features may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features can be incorporated in software and/or firmware for controlling the hardware of a processing system, and for enabling a processing system to interact with other mechanism utilizing the results. Such software or firmware may include, but is not limited to, application code, device drivers, operating systems and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description has been provided for the purposes of illustration and description. It is not intended to be exhaustive or to limit the invention to the precise forms disclosed. The breadth and scope should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

What is claimed is:

1. A movable object, comprising:
   a propulsion system;
   a main body coupled to the propulsion system;
   a payload assembly coupled to the main body via a payload port, the payload assembly comprising a payload support bracket configured to couple to the payload port and support a scanning sensor;
   a positioning sensor;
   at least one memory including instructions; and
   at least one processor, wherein the instructions when executed by the at least one processor, cause the movable object to at least to:
      receive control data from an external device,
      move the scanning sensor with respect to the movable object via a movement of the payload assembly based on the control data,
      obtain mapping data from the scanning sensor in a first coordinate system based on the control data,
      obtain positioning data from the positioning sensor,
      construct a dense map in real-time based on the mapping data and the positioning data, and
      transform the dense map into a sparse map;
   and
   a communication device configured to transmit the sparse map to the external device in real-time
   wherein the external device is configured to:
      receive the sparse map; and
      render the sparse map in a second coordinate system in real-time, the second coordinate system being different from the first coordinate system,
      wherein the first coordinate system is a scanner reference coordinate system, and the second coordinate system is a north-east-down (NED) coordinate system or a FlightGear coordinate system.

2. The movable object of claim 1, wherein the payload support bracket is configured to orient the scanning sensor at a predetermined scanning angle relative to the main body.

3. The movable object of claim 2, wherein the payload assembly comprises adjustable pivot brackets coupled to the payload support bracket, the adjustable pivot brackets configured to provide a plurality of predetermined scanning angles for orienting the scanning sensor relative to the main body.

4. The movable object of claim 3, wherein the payload assembly comprises a payload support structure coupled to the payload support bracket via adjustable pivot brackets, the payload support structure configured to support the scanning sensor and the positioning sensor.

5. The movable object of claim 4, wherein the payload support structure comprises a scanning sensor support and a positioning sensor support, the scanning sensor support receiving the scanning sensor and the positioning sensor support accommodating the positioning sensor.

6. The movable object of claim 4, wherein the positioning sensor support comprises a positioning sensor enclosure configured to expose the positioning sensor support for placing or changing a type of the positioning sensor.

7. The movable object of claim 1, wherein the payload support bracket configured to releasably couple to the payload port using a quick release connection.

8. The movable object of claim 2, wherein the predetermined scanning angle relative to the main body is selected based on a scanning pattern of the scanning sensor.

9. The movable object of claim 1, wherein the positioning sensor is configured to detect a pose of the scanning sensor.

10. The movable object of claim 1, wherein the instructions, when executed by the at least one processor, cause the movable object to at least to process the mapping data and the positioning data using sensor fusion.

11. The movable object of claim 10, wherein the instructions, when executed by the at least one processor, cause the movable object to at least to correlate the mapping data and the positioning data using time data, wherein the time data is obtained based on a reference clock signal associated with the scanning sensor, the positioning sensor, or a synchronization module coupled to the at least one processors.

12. The movable object of claim 1, wherein the payload assembly includes a payload processor, wherein the payload processor configured to process the mapping data obtained by the scanning sensor and the positioning data obtained by the positioning sensor using sensor fusion to generate post-processed sensor data.

13. The movable object of claim 12, wherein the payload port is configured to transmit the post-processed sensor data to the at least one processor.

14. The movable object of claim 1, wherein the payload port is provided by a mounting assembly configured to couple the payload assembly to the main body, wherein the mounting assembly includes one or more dampers configured to reduce vibration to the payload assembly caused by the main body.

15. The movable object of claim 1, wherein the instructions further cause the movable object to: cause the positioning sensor to output a clock signal to the scanning sensor.

16. The movable object of claim 1, wherein the instructions further cause the movable object to: output the mapping data or the map to the external device in a LiDAR Data Exchange (LAS) file.

17. A movable object system, comprising:
a propulsion system;
a main body coupled to the propulsion system;
a payload assembly coupled to the main body via a payload port, the payload assembly comprising a payload support bracket configured to couple to the payload port and support a scanning sensor;
a positioning sensor;
at least one memory including instructions; and
at least one processor, wherein the instructions when executed by the at least one processor, cause the movable object to at least to:
  receive control data from an external device,
  move the scanning sensor with respect to the movable object system via a movement of the payload assembly based on the control data,
  obtain mapping data from the scanning sensor in a first coordinate system based on the control data,
  obtain positioning data from the positioning sensor,
  construct a dense map in real-time based on the mapping data and the positioning data, and
  transform the dense map into a sparse map;
a communication device to transmit the sparse map to the external device in real-time; and
the external device configured to:
  receive the sparse map in real-time; and
  render the sparse map in a second coordinate system in real-time, the second coordinate system being different from the first coordinate system,
wherein the first coordinate system is a scanner reference coordinate system, and the second coordinate system is a north-east-down (NED) coordinate system or a FlightGear coordinate system.

18. A movable object, comprising:
a propulsion system;
a main body coupled to the propulsion system;
a payload assembly coupled to the main body via a payload port, the payload assembly comprising a payload support bracket configured to couple to the payload port and support a scanning sensor and IMU sensor;
a positioning sensor including GPS sensor and/or RTK sensor;
at least one memory including instructions;
at least one processor, wherein the instructions when executed by the at least one processor, cause the movable object to at least to:
  receive control data from an external device;
  move the scanning sensor with respect to the movable object via a movement of the payload assembly based on the control data;
  obtain mapping data from the scanning sensor in a first coordinate system based on the control data;
  obtain positioning data from the positioning sensor and IMU data indicating an attitude of the scanning sensor from the IMU sensor; and
  construct a map in real-time based on the mapping data, the positioning data and the IMU data; and
a communication device configured to transmit the map to the external device in real-time,
wherein the external device is configured to:
  receive the sparse map; and
  render the sparse map in a second coordinate system in real-time, the second coordinate system being different from the first coordinate system,
wherein the first coordinate system is a scanner reference coordinate system, and the second coordinate system is a north-east-down (NED) coordinate system or a FlightGear coordinate system.

* * * * *